(12) United States Patent
Denney et al.

(10) Patent No.: US 9,116,981 B2
(45) Date of Patent: Aug. 25, 2015

(54) SYSTEMS AND METHODS FOR CLUSTER ANALYSIS WITH RELATIONAL TRUTH

(75) Inventors: Bradley Scott Denney, Irvine, CA (US); Dariusz T. Dusberger, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 13/542,433

(22) Filed: Jul. 5, 2012

(65) Prior Publication Data

US 2014/0012848 A1 Jan. 9, 2014

(51) Int. Cl.
*G06F 17/00* (2006.01)
*G06F 17/30* (2006.01)

(52) U.S. Cl.
CPC .... *G06F 17/30707* (2013.01); *G06F 17/30734* (2013.01)

(58) Field of Classification Search
USPC .......................................................... 706/45
See application file for complete search history.

(56) References Cited

U.S. PATENT DOCUMENTS

| | | | |
|---|---|---|---|
| 7,801,998 B2 * | 9/2010 | Mazzagatte et al. | 709/227 |
| 8,571,333 B2 * | 10/2013 | Denney et al. | 382/225 |
| 8,630,490 B2 * | 1/2014 | Denney et al. | 382/190 |
| 8,977,041 B2 * | 3/2015 | Lu et al. | 382/159 |
| 2010/0293166 A1 | 11/2010 | Hatami-Hanza | |
| 2011/0040766 A1 | 2/2011 | Robinson et al. | |
| 2011/0113095 A1 | 5/2011 | Hatami-Hanza | |
| 2011/0202526 A1 | 8/2011 | Lee et al. | |
| 2011/0238410 A1 | 9/2011 | Larcheveque et al. | |
| 2011/0264699 A1 | 10/2011 | Antonelli et al. | |

OTHER PUBLICATIONS

Out-of-sample extrapolation using semi-supervised manifold learning (OSE-SSL): Content-based image retrieval for prostate histology grading Sparks, R. ; Madabhushi, A. Biomedical Imaging: From Nano to Macro, 2011 IEEE International Symposium on DOI: 10.1109/ISBI.2011.5872510 Publication Year: 2011, pp. 734-737.*
New feature selection methods based on context similarity for text categorization Yifei Chen ; Bingqing Han ; Ping Hou Fuzzy Systems and Knowledge Discovery (FSKD), 2014 11th International Conference on DOI: 10.1109/FSKD.2014.6980902 Publication Year: 2014, pp. 598-604.*
Mutuality measures corresponding to subjective judgment of similarity and matching Yoshikawa, A. Fuzzy Systems Conference Proceedings, 1999. FUZZ-IEEE '99. 1999 IEEE International vol. 1 DOI: 10.1109/Fuzzy.1999.793202 Publication Year: 1999, pp. 33-37 vol. 1.*
Human Perception based Image Retrieval using Emergence Index and Fuzzy Similarity Measure Deb, S. ; Kulkarni, S. Intelligent Sensors, Sensor Networks and Information, 2007. ISSNIP 2007. 3rd International Conference on DOI: 10.1109/ISSNIP.2007.4496870 Publication Year: 2007, pp. 359-363.*

(Continued)

*Primary Examiner* — Michael B Holmes
(74) *Attorney, Agent, or Firm* — Canon U.S.A., Inc. IP Division

(57) ABSTRACT

Systems and methods for measuring similarity between a set of clusters and a set of object labels, wherein at least two of the object labels are related, receive a first set of clusters, wherein the first set of clusters was formed by clustering objects in a set of objects into clusters of the first set of clusters according to a clustering procedure; and calculate a similarity index between the first set of clusters and a set of object labels based at least in part on a relationship between two or more object labels in the set of object labels.

15 Claims, 27 Drawing Sheets

(56) References Cited

OTHER PUBLICATIONS

Jia Deng et al., Hedging Your Bets: Optimizing Accuracy-Specificity Trade-offs in Large Scale Visual Recognition, IEEE Conference on Computer Vision and Pattern Recognition(CVPR), Jun. 2012.
Jia Deng et al., What does classifying more than 10,000 image categories tell us?, European Conference on Computer Vision(ECCV), 2010.
Jia Deng et al., ImageNet: A Large-Scale Hierarchical Image Database, IEEE Conference on Computer Vision and Pattern Recognition(CVPR), 2009.
Liang Bai et al., Video Semantic Concept Detection Using Ontology, Proceedings of the Third International Conference on Internet Multimedia Computing and Service, 2011.
Jayanta Basak, Online Adaptive Hierarchical Clustering in a Decision Tree Framework, Journal of Pattern Recognition Research 2 (2011) 201-229, Received Mar. 8, 2011, Accepted May 17, 2011.
G. Carneiro et al., Supervised Learning of Semantic Classes for Image Annotation and Retrieval, IEEE Transactions on Pattern Analysis and Machine Intelligence, vol. 29, Issue: 3, Mar. 2007.
Rui Pedro Chaves, Wordnet and Automated Text Summarization, NLPRS 2001, 6th Natural Language Processing Pacific Rim Symposium, pp. 109-116.
Yen-Liang Chen, Constructing a decision tree from data with hierarchical class labels, Expert Systems with Applications 36 (2009).
Jia Deng, Hierarchical semantic indexing for large scale image retrieval, 2011 IEEE Conference on Computer Vision and Pattern Recognition (CVPR), Jun. 2011.
Matthijs Douze et al., Combining attributes and Fisher vectors for efficient image retrieval, CVPR, 2011: 745-752.
Rob Fergus et al., Semantic Label Sharing for Learning with Many Categories, Lecture Notes in Computer Science, 2010, vol. 6311/2010.
L. Hollink et al., A Multidisciplinary Approach to Unlocking Television Broadcast Archives, Interdisciplinary Science Reviews, vol. 34 No. 2, Jun. 2009, 257-271.
L. Hollink et al., Building a visual ontology for video retrieval, Proceedings of the 13th annual ACM international conference on Multimedia, Nov. 6-11, 2005.
L. Hollink, Semantic annotation for retrieval of visual resources, PhD Thesis, defended Nov. 2006.
S. Prakash Kumar et al., Efficient Quality Assessment Technique with Integrated Cluster Validation and Decision Trees, International Journal of Computer Applications (0975-8887) vol. 21—No. 9, May 2011.
Congcong Li et al., θ-MRF: Capturing Spatial and Semantic Structure in the Parameters for Scene Understanding, 2011.
Bing Liu et al., Clustering Via Decision Tree Construction, in Foundations and Advances in Data Mining (p. 99-124), 2005.
Jorg Mennicke, Classifier Learning for Imbalanced Data with Varying Misclassification Costs, Diplomarbeit im Studiengang Wirtschaftsinformatik der Fakultat Wirtschaftsinformatik and Angewandte Informatik an der Otto-Friedrich-Universitat Bamberg, Nov. 30, 2006.
Alexei D. Miasnikov et al., A Hierarchical Projection Pursuit Clustering Algorithm, 17th International Conference on Pattern Recognition (ICPR'04), vol. 1, (2004), 268-271.
Hans-Joachim Mucha, on Validation of Hierarchical Clustering, Studies in Classification, Data Analysis, and Knowledge Organization, 2007, Part I, 115-122.
Michael Pechuk et al., Learning function-based object classification from 3D imagery, Comput. Vis. Image Understand. (2007).
Cosma Shalizi, Distances between Clustering, Hierarchical Clustering, 36-350, Data Mining, Sep. 14, 2009.
Li Shen et al., Learning-to-Share Based on Finding Groups for Large Scale Image Classification, 2011.
Cees G. M. Snoek et al., Adding Semantics to Detectors for Video Retrieval, IEEE Transactions on Multimedia, Vol. 9, No. 5, Aug. 2007.
Nakul Verma et al., Learning Hierarchical Similarity Metrics, IEEE Conference on Computer Vision and Pattern Recognition (CVPR), 2012.
What is Wordnet?, Princeton University, Jan. 6, 2012, downloaded from http://wordnet.princeton.edu/.
Heiga Zen et al., Decision tree-based context clustering based on cross validation and hierarchical priors, IEEE International Conference on Acoustics, Speech and Signal Processing (ICASSP), 2011.

* cited by examiner

|  | Dog | Cat | Quadruped | Monkey | Ape | Biped | Animal |
|---|---|---|---|---|---|---|---|
| Dog | 3 | 2 | 2 | 1 | 1 | 1 | 1 |
| Cat | 2 | 3 | 2 | 1 | 1 | 1 | 1 |
| Quadruped | 2 | 2 | 2 | 1 | 1 | 1 | 1 |
| Monkey | 1 | 1 | 1 | 3 | 2 | 2 | 1 |
| Ape | 1 | 1 | 1 | 2 | 3 | 2 | 1 |
| Biped | 1 | 1 | 1 | 2 | 2 | 2 | 1 |
| Animal | 1 | 1 | 1 | 1 | 1 | 1 | 1 |

|  | Dog | Cat | Quadruped | Monkey | Ape | Biped | Animal |
|---|---|---|---|---|---|---|---|
| Dog | 1 | 2/3 | 2/3 | 1/3 | 1/3 | 1/3 | 1/3 |
| Cat | 2/3 | 1 | 2/3 | 1/3 | 1/3 | 1/3 | 1/3 |
| Quadruped | 2/3 | 2/3 | 1 | 1/3 | 1/3 | 1/2 | 1/2 |
| Monkey | 1/3 | 1/3 | 1/3 | 1 | 2/3 | 2/3 | 1/3 |
| Ape | 1/3 | 1/3 | 1/3 | 2/3 | 1 | 2/3 | 1/3 |
| Biped | 1/3 | 1/3 | 1/2 | 2/3 | 2/3 | 1 | 1/2 |
| Animal | 1/3 | 1/3 | 1/2 | 1/3 | 1/3 | 1/2 | 1 |

|  | Dog | Cat | Quadruped | Monkey | Ape | Biped | Animal |
|---|---|---|---|---|---|---|---|
| Dog | 1 | .61 | .88 | .14 | .14 | .32 | .61 |
| Cat | .61 | 1 | .88 | .14 | .14 | .32 | .61 |
| Quadruped | .88 | .88 | 1 | .32 | .32 | .61 | .88 |
| Monkey | .14 | .14 | .32 | 1 | .61 | .88 | .61 |
| Ape | .14 | .14 | .32 | .61 | 1 | .88 | .61 |
| Biped | .32 | .32 | .61 | .88 | .88 | 1 | .88 |
| Animal | .61 | .61 | .88 | .61 | .61 | .88 | 1 |

| U / V | $v_1$ | $v_j$ | . | . | . | $v_C$ | Sums |
|---|---|---|---|---|---|---|---|
| $u_1$ | $M_{11}$ | $M_{12}$ | . | . | $M_{15}$ | $M_{1C}$ | $a_1$ |
| $u_i$ | $M_{21}$ | ●● | . | ● | ● | $M_{2C}$ | $a_2$ |
| . | . | . | . | . | . | . | . |
| . | . | ● | . | ● | . | . | . |
| $u_R$ | $M_{R1}$ | ● | . | ● | . | $M_{RC}$ | $a_R$ |
| Sums | $b_1$ | $b_j$ | . | . | . | $b_C$ | N |

|  | $V_1$ | $V_2$ | $V_3$ | $V_4$ | Sums |
|---|---|---|---|---|---|
| Dog | 1 | 2 | 0 | 1 | 4 |
| Cat | 4 | 0 | 0 | 1 | 5 |
| Quad-ruped | 0 | 0 | 0 | 0 | 0 |
| Monkey | 0 | 0 | 6 | 0 | 6 |
| Ape | 0 | 0 | 0 | 0 | 0 |
| Biped | 0 | 0 | 0 | 0 | 0 |
| Animal | 0 | 0 | 0 | 0 | 0 |
| Sums | 5 | 2 | 6 | 2 | 15 |

1300

|  | Dog | Cat | Monkey |
|---|---|---|---|
| Dog | 1 | .61 | .14 |
| Cat | .61 | 1 | .14 |
| Monkey | .14 | .14 | 1 |

1395

| U / V | $V_1$ | $V_2$ | $V_3$ | $V_4$ | Sums |
|---|---|---|---|---|---|
| Dog | 1 | 2 | 0 | 1 | 4 |
| Cat | 4 | 0 | 0 | 1 | 5 |
| Monkey | 0 | 0 | 6 | 0 | 6 |
| Sums | 5 | 2 | 6 | 2 | 15 |

| U / V | $V_1$ | $V_2$ | $V_3$ | Sums |
|---|---|---|---|---|
| Dog | 0 | 4 | 0 | 4 |
| Cat | 4 | 1 | 0 | 5 |
| Monkey | 0 | 0 | 6 | 6 |
| Sums | 4 | 5 | 6 | 15 |

1401

| U / V | $V_1$ | $V_2$ | $V_3$ | Sums |
|---|---|---|---|---|
| Dog | 0 | 4 | 0 | 4 |
| Cat | 5 | 0 | 0 | 5 |
| Monkey | 0 | 1 | 5 | 6 |
| Sums | 5 | 5 | 5 | 15 |

1402

| U / V | $V_1$ | $V_2$ | $V_3$ | Sums |
|---|---|---|---|---|
| Dog | 0 | 4 | 0 | 4 |
| Cat | 3 | 2 | 0 | 5 |
| Monkey | 0 | 0 | 6 | 6 |
| Sums | 3 | 6 | 6 | 15 |

FIG. 14

|  | Dog | Cat | Croco-dilian | Apato-saurus | Quad-ruped | Monkey | Ape | Ostrich | Tyranno-Saurus Rex | Biped | Tetra-pod | Snake | No Legs | Animal |
|---|---|---|---|---|---|---|---|---|---|---|---|---|---|---|
| Dog | 1 | 3/4 | 3/4 | 3/4 | 3/4 | 1/2 | 1/2 | 1/2 | 1/2 | 1/2 | 1/2 | 1/4 | 1/4 | 1/4 |
| Cat | 3/4 | 1 | 3/4 | 3/4 | 3/4 | 1/2 | 1/2 | 1/2 | 1/2 | 1/2 | 1/2 | 1/4 | 1/4 | 1/4 |
| Crocodilian | 3/4 | 3/4 | 1 | 3/4 | 3/4 | 1/2 | 1/2 | 1/2 | 1/2 | 1/2 | 1/2 | 1/4 | 1/4 | 1/4 |
| Apatosaurus | 3/4 | 3/4 | 3/4 | 1 | 3/4 | 1/2 | 1/2 | 1/2 | 1/2 | 1/2 | 1/2 | 1/4 | 1/4 | 1/4 |
| Quadruped | 3/4 | 3/4 | 3/4 | 3/4 | 1 | 1/2 | 1/2 | 1/2 | 1/2 | 2/3 | 2/3 | 1/3 | 1/3 | 1/3 |
| Monkey | 1/2 | 1/2 | 1/2 | 1/2 | 1/2 | 1 | 3/4 | 3/4 | 3/4 | 3/4 | 1/2 | 1/4 | 1/4 | 1/4 |
| Ape | 1/2 | 1/2 | 1/2 | 1/2 | 1/2 | 3/4 | 1 | 3/4 | 3/4 | 3/4 | 1/2 | 1/4 | 1/4 | 1/4 |
| Ostrich | 1/2 | 1/2 | 1/2 | 1/2 | 1/2 | 3/4 | 3/4 | 1 | 3/4 | 3/4 | 1/2 | 1/4 | 1/4 | 1/4 |
| Tyrannosaurus Rex | 1/2 | 1/2 | 1/2 | 1/2 | 1/2 | 3/4 | 3/4 | 3/4 | 1 | 3/4 | 1/2 | 1/4 | 1/4 | 1/4 |
| Biped | 1/2 | 1/2 | 1/2 | 1/2 | 2/3 | 1/2 | 1/2 | 1/2 | 1/2 | 1 | 2/3 | 1/3 | 1/3 | 1/3 |
| Tetrapod | 1/2 | 1/2 | 1/2 | 1/2 | 2/3 | 1/4 | 1/4 | 1/4 | 1/4 | 2/3 | 1 | 1/3 | 1/2 | 1/2 |
| Snake | 1/4 | 1/4 | 1/4 | 1/4 | 1/3 | 1/4 | 1/4 | 1/4 | 1/4 | 1/3 | 1/3 | 1 | 2/3 | 1/3 |
| No legs | 1/4 | 1/4 | 1/4 | 1/4 | 1/3 | 1/4 | 1/4 | 1/4 | 1/4 | 1/3 | 1/2 | 2/3 | 1 | 1/2 |
| Animal | 1/4 | 1/4 | 1/4 | 1/4 | 1/3 | 1/4 | 1/4 | 1/4 | 1/4 | 1/3 | 1/2 | 1/3 | 1/2 | 1 |

FIG. 17

|  | Dog | Cat | Monkey | Hair | Croco-dilian | Apato-saurus | Tyranno-saurus Rex | Snake | Scales | Teeth | Ostrich | Feathers | No Teeth | Animal |
|---|---|---|---|---|---|---|---|---|---|---|---|---|---|---|
| Dog | 1 | 3/4 | 3/4 | 3/4 | 1/2 | 1/2 | 1/2 | 1/2 | 1/2 | 1/2 | 1/4 | 1/4 | 1/4 | 1/4 |
| Cat | 3/4 | 1 | 3/4 | 3/4 | 1/2 | 1/2 | 1/2 | 1/2 | 1/2 | 1/2 | 1/4 | 1/4 | 1/4 | 1/4 |
| Monkey | 3/4 | 3/4 | 1 | 3/4 | 1/2 | 1/2 | 1/2 | 1/2 | 1/2 | 1/2 | 1/4 | 1/4 | 1/4 | 1/4 |
| Hair | 3/4 | 3/4 | 3/4 | 1 | 1/2 | 1/2 | 1/2 | 1/2 | 2/3 | 2/3 | 1/4 | 1/3 | 1/3 | 1/3 |
| Crocodilian | 1/2 | 1/2 | 1/2 | 1/2 | 1 | 3/4 | 3/4 | 3/4 | 3/4 | 2/3 | 1/4 | 1/4 | 1/4 | 1/4 |
| Apatosaurus | 1/2 | 1/2 | 1/2 | 1/2 | 3/4 | 1 | 3/4 | 3/4 | 3/4 | 1/2 | 1/4 | 1/4 | 1/4 | 1/4 |
| Tyrannosaurus Rex | 1/2 | 1/2 | 1/2 | 1/2 | 3/4 | 3/4 | 1 | 3/4 | 3/4 | 1/2 | 1/4 | 1/4 | 1/4 | 1/4 |
| Snake | 1/2 | 1/2 | 1/2 | 1/2 | 3/4 | 3/4 | 3/4 | 1 | 2/3 | 2/3 | 1/4 | 1/4 | 1/4 | 1/4 |
| Scales | 1/2 | 1/2 | 1/2 | 2/3 | 3/4 | 3/4 | 3/4 | 2/3 | 1 | 1/4 | 1/4 | 1/3 | 1/3 | 1/3 |
| Teeth | 1/2 | 1/2 | 1/2 | 2/3 | 1/4 | 1/4 | 1/4 | 1/4 | 1/4 | 1 | 1/4 | 1/3 | 1/3 | 1/2 |
| Ostrich | 1/4 | 1/4 | 1/4 | 1/4 | 1/4 | 1/4 | 1/4 | 1/4 | 1/3 | 1/3 | 1 | 3/4 | 1/2 | 1/2 |
| Feathers | 1/4 | 1/4 | 1/4 | 1/3 | 1/4 | 1/4 | 1/4 | 1/4 | 1/3 | 1/2 | 3/4 | 1 | 2/3 | 1/3 |
| No teeth | 1/4 | 1/4 | 1/4 | 1/3 | 1/4 | 1/4 | 1/4 | 1/4 | 1/3 | 1/2 | 1/2 | 2/3 | 1 | 1/2 |
| Animal | 1/4 | 1/4 | 1/4 | 1/3 | 1/4 | 1/4 | 1/4 | 1/4 | 1/3 | 1/2 | 1/2 | 1/3 | 1/2 | 1 |

FIG. 19

| | Trapezoid | Rectangle | Rhombus | Square | Scalene Triangle | Equilateral Triangle | Regular Hexagon | Star-shaped | Self-intersecting Quadrilateral | Circle | Ellipse |
|---|---|---|---|---|---|---|---|---|---|---|---|
| Trapezoid | 1 | 4/5 | 4/5 | 4/5 | 3/5 | 3/5 | 3/5 | 2/5 | 2/5 | 1/5 | 1/5 |
| Rectangle | 4/5 | 1 | 4/5 | 4/5 | 3/5 | 3/5 | 3/5 | 2/5 | 2/5 | 1/5 | 1/5 |
| Rhombus | 4/5 | 4/5 | 1 | 4/5 | 3/5 | 3/5 | 3/5 | 2/5 | 2/5 | 1/5 | 1/5 |
| Square | 4/5 | 4/5 | 4/5 | 1 | 3/5 | 3/5 | 3/5 | 2/5 | 2/5 | 1/5 | 1/5 |
| Scalene Triangle | 3/5 | 3/5 | 3/5 | 3/5 | 1 | 4/5 | 3/5 | 2/5 | 2/5 | 1/5 | 1/5 |
| Equilateral Triangle | 3/5 | 3/5 | 3/5 | 3/5 | 4/5 | 1 | 3/5 | 2/5 | 2/5 | 1/5 | 1/5 |
| Regular Hexagon | 3/5 | 3/5 | 3/5 | 3/5 | 3/5 | 3/5 | 1 | 2/5 | 2/5 | 1/5 | 1/5 |
| Star-shaped | 2/5 | 2/5 | 2/5 | 2/5 | 2/5 | 2/5 | 2/5 | 1 | 3/5 | 1/5 | 1/5 |
| Self-intersecting Quadrilateral | 2/5 | 2/5 | 2/5 | 2/5 | 2/5 | 2/5 | 2/5 | 3/5 | 1 | 1/5 | 1/5 |
| Circle | 1/5 | 1/5 | 1/5 | 1/5 | 1/5 | 1/5 | 1/5 | 1/5 | 1/5 | 1 | 2/3 |
| Ellipse | 1/5 | 1/5 | 1/5 | 1/5 | 1/5 | 1/5 | 1/5 | 1/5 | 1/5 | 2/3 | 1 |

FIG. 22

Table 2501

| | Using S 595 | | Using S 596 | | Using S 1700 | | Using S 1900 | |
|---|---|---|---|---|---|---|---|---|
| | RRI ERRI | ARRI | RRI ERRI | ARRI | RRI ERRI | ARRI | RRI ERRI | ARRI |
| Set 100A | 0.527 0.4389 | 0.0881 | 0.6145 0.5108 | 0.1037 | 0.4476 0.3727 | 0.0749 | 0.3429 0.2889 | 0.054 |
| Set 200A | 0.6317 0.4389 | 0.1928 | 0.7366 0.5108 | 0.2258 | 0.5381 0.3727 | 0.1654 | 0.4095 0.2889 | 0.1206 |
| Set 200B | 0.6762 0.4552 | 0.221 | 0.7821 0.5079 | 0.2742 | 0.581 0.4067 | 0.1743 | 0.4524 0.3452 | 0.1072 |
| Set 200C | 0.6413 0.4552 | 0.1861 | 0.7368 0.5079 | 0.2289 | 0.5524 0.4067 | 0.1457 | 0.4429 0.3452 | 0.0977 |
| Set 200D | 0.6698 0.4552 | 0.2146 | 0.7714 0.5079 | 0.2635 | 0.581 0.4067 | 0.1743 | 0.4524 0.3452 | 0.1072 |

Table 2502

| | Using S 1700 | | Using S 1900 | |
|---|---|---|---|---|
| | RRI ERRI | ARRI | RRI ERRI | ARRI |
| Set 1500A | 0.5237 0.4602 | 0.0635 | 0.497 0.4431 | 0.0539 |
| Set 1500B | 0.4941 0.4602 | 0.0339 | 0.5247 0.4431 | 0.0816 |

Table 2503

| | Using S 2200 | |
|---|---|---|
| | RRI ERRI | ARRI |
| Set 2000A | 0.6 0.5399 | 0.0601 |
| Set 2000B | 0.6366 0.5324 | 0.1042 |

FIG. 25

SYSTEMS AND METHODS FOR CLUSTER ANALYSIS WITH RELATIONAL TRUTH

BACKGROUND

1. Field

The present disclosure relates to data clustering, and more particularly relates to organizing objects into clusters of related objects, such as organizing a group of images into one or more clusters of related images.

2. Background

In the field of digital imaging, a large set of images may be partitioned into smaller clusters of images. For example, a computing device may organize a large collection of images into a two or more clusters of images in which the images in a certain cluster are similar to each other. To that end, a number of different clustering procedures have been developed to automatically cluster images based on features of the images.

SUMMARY

In one embodiment, a method for measuring similarity between a set of clusters and a set of object labels, wherein at least two of the object labels are related, comprises receiving a first set of clusters, wherein the first set of clusters was formed by clustering objects in a set of objects into clusters of the first set of clusters according to a clustering procedure; and calculating a similarity index between the first set of clusters and a set of object labels based at least in part on a relationship between two or more object labels in the set of object labels.

In one embodiment, a system for measuring similarity between a set of clusters and a corresponding set of object labels comprises a computer-readable medium configured to store computer-executable instructions; and one or more processors configured to cause the system to receive a set of object clusters, wherein the set of object clusters includes two or more clusters, receive a set of object labels, and generate a similarity index between the set of clusters and the set of object labels based at least in part on a relationship between two or more object labels in the set of object labels.

In one embodiment, one or more computer-readable media store instructions that, when executed by one or more computing devices, cause the one or more computing devices to perform operations comprising receiving a set of clusters of objects, wherein the set of clusters includes two or more clusters of objects; receiving a set of object labels of objects, wherein the set of object labels includes two or more labels; and calculating a similarity index between the set of clusters and the set of object labels based at least in part on a relationship between two or more object labels in the set of object labels.

BRIEF DESCRIPTION OF THE DRAWINGS

FIG. 4 illustrates an example embodiment of a similarity-like matrix.

FIG. 5 illustrates example embodiments of similarity matrices.

FIG. 6 illustrates an example embodiment of pair counting in a contingency table.

FIG. 13 illustrates example embodiments of contingency tables and a similarity matrix.

FIG. 14 illustrates example embodiments of contingency tables.

FIG. 17 illustrates an example embodiment of a similarity matrix.

FIG. 19 illustrates an example embodiment of a similarity matrix.

FIG. 22 illustrates an example embodiment of a similarity matrix.

FIG. 25 shows the respective similarity indexes, expected values of the similarity indexes, and adjusted similarity indexes for sets of clusters and ontologies.

DESCRIPTION

The following disclosure describes certain explanatory embodiments. Additionally, the explanatory embodiments may include several novel features, and a particular feature may not be essential to practice the systems and methods described herein.

Figure 1:
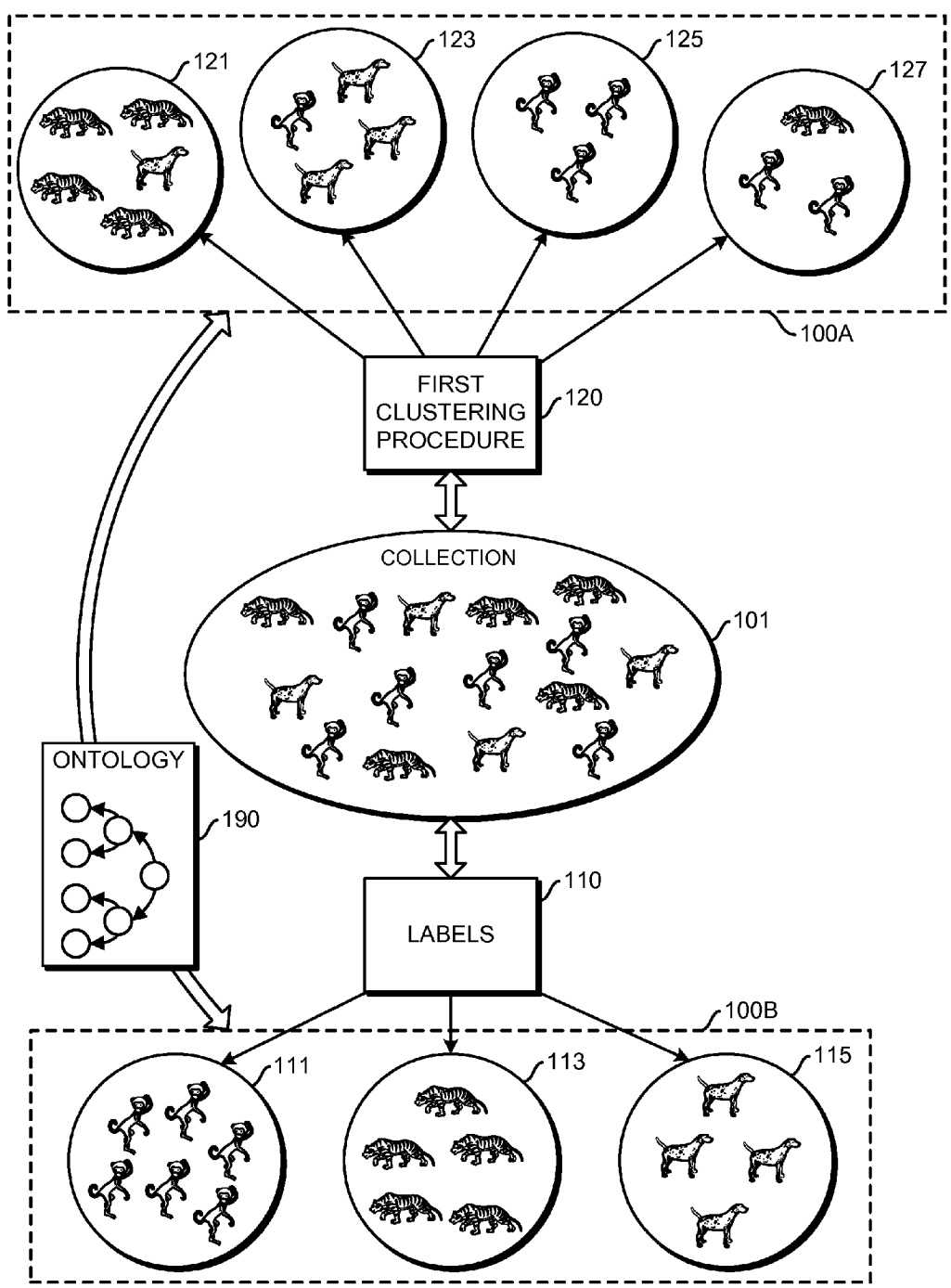
FIG. 1 is a block diagram that illustrates an example embodiment of objects in a collection that are organized into sets of clusters.

FIG. 1 is a block diagram that illustrates an example embodiment of objects in a collection 101 that are organized into two sets of clusters, a first set of clusters 100A (also referred to herein as the "first set 100A") and a second set of clusters 100B (also referred to herein as the "second set 100B"). For example, to sort a large collection 101 of images, a computing device may sort the images according to a clustering procedure. Using the clustering procedure, the computing device evaluates the visual features in the images and groups similar images (e.g., visually similar objects) together in respective clusters (e.g., clusters 121-127, clusters 111-115). Next, a computing device may compare the sets of clusters 100A-B (e.g., the first set 100A and the second set 100B) to one another, for example to measure the similarity of the sets of clusters 100A-B. When comparing the sets of clusters 100A-B, the computing device may use an ontology 190 that defines relationships between the objects (e.g., by describing a relationship between object labels). For example, an ontological relationship may indicate that a coyote is closer to a wolf than to a fish. Thus, a similarity measure of the sets of clusters that is generated with the ontological relationship will be based on the inter-set relationships of the clusters (e.g., the relationship between the clusters 121-127 of the first set 100A and the clusters 111-115 of a second set 100B) and the intra-set relationships of the clusters (e.g., between the clusters 111-115 within the second set 100B, which may be the object labels).

To generate the clusters, the objects in the collection 101 are organized according to a first clustering procedure 120 into a first set of clusters 100A, which includes clusters 121, 123, 125, and 127. The objects in the collection 101 are also organized according a second clustering procedure, which is based on object labels 110 (e.g., semantic information, for example tags) in this example, into a second set of clusters 100B, which includes clusters 111, 113, and 115. The clusters 111-115 formed by applying the object labels 110 may be assumed to indicate a ground "truth" about the objects. For example, in the embodiment shown in FIG. 1, the clusters 111-115 indicate the respective types of animals shown in the images in the respective clusters (e.g., dog, tiger, monkey). The respective object labels of the objects (i.e., the images in this embodiment) may be semantic labels that were added by a user. For example, a user may add the semantic label "tiger" to an image of a tiger, and the semantic label may be used to cluster the image with other images that have the semantic label "tiger."

Also, in some embodiments clustering images includes feature extraction from each image in the collection of images. Colors, shapes, textures, and additional local features like SIFT bag of words, among many others, can be extracted, and clustering is performed based on features extracted from the images. For example, a procedure for clustering images of cars does not usually operate in the pixel space of the images, but instead works with features, such as color or shape, extracted from the images. Thus, objects may be clustered based on features extracted from the objects. For example, images may be clustered with other visually similar images. Other features may be used as well. For example, if the objects are documents, the features may be words or phrases in the documents. If the objects are sounds (e.g., songs, voices, noises), the features may include frequency, wavelength, pitch, timbre, tone, etc. Also, in addition to the features, other data associated with the objects, including metadata, may be used, for example date of creation, date of modification, author, location of creation, device that created the object, time of day of creation of the object, type of object, etc. Also, labels (e.g., tags) may be used to cluster objects.

Next, a comparison measure is selected to compare respective features of the images. For example, the comparison measure could be a chi-squared distance, a "histogram intersection" measure, Cosine distance, Tanimoto coefficient, Lp distances, Earth movers distance, or Hamming distance, among many others. The respective features of the images are compared based on the comparison measure, and a group of measures representing the differences between the respective features of the images is generated. For example, each image may be compared against every other image in the collection of images, and the output measures indicate how similar (or different) the images are according to the selected comparison measure. As an example, for a collection of images, the feature could be a respective SIFT bag of words vector that is generated for every image. The features of each image can be compared to the features of every other image in the collection using a cosine similarity measure of the SIFT bag of words vector, which would generate a similarity score for every image pair in the collection of images. Additionally, the other data associated with the images may be compared.

Also, a computing device may compare the results of different clustering procedures, for example compare the results (e.g., set of clusters) generated by a clustering procedure that uses object labels (assumed to indicate a ground "truth") with the results (e.g., set of clusters) generated by a clustering procedure that uses features (e.g., a visual similarity). Thus, clusters 111-115 may be compared with clusters 121-127 to determine how accurately the first clustering procedure 120 assigns objects (e.g., based on visual similarity) to respective clusters relative to the object labels 110. The results may indicate how effectively the first clustering procedure 120 visually identifies objects.

Figure 2:
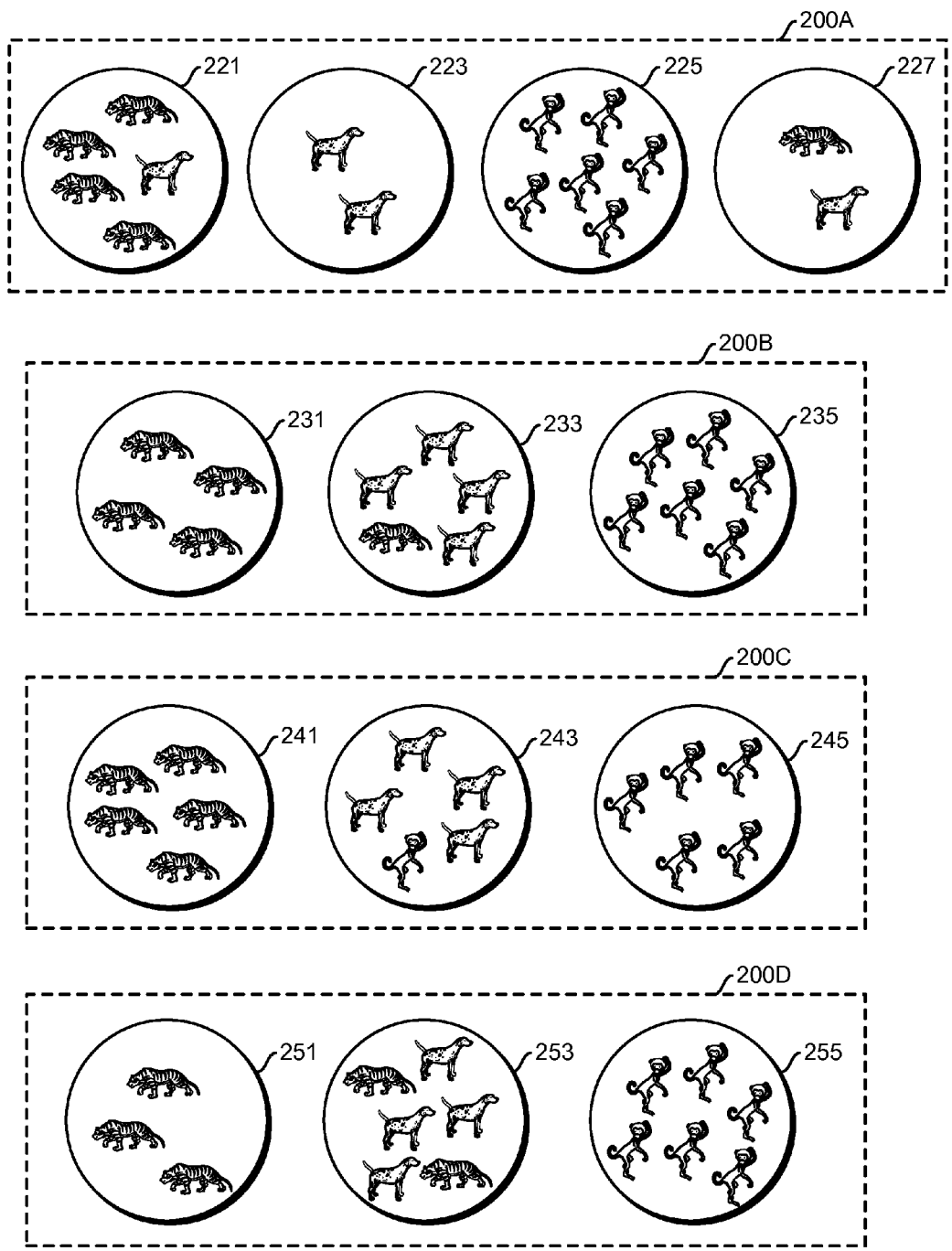
FIG. 2 illustrates example embodiments of sets of clusters.

In FIG. 1, the number of objects in the collection 101 and the number of clusters in the sets of clusters 100A-B are shown as examples. In other embodiments the collection 101 may include more or less objects. Also, though the first clustering procedure 120 assigned the objects to four clusters, in other embodiments the objects may be assigned to more or less clusters (e.g., 2, 7, 9, 25, 34, X (where X is an arbitrary number of clusters)). The number of clusters may be constrained to be less than or equal to the total number of objects in the collection 101. FIG. 2 illustrates example embodiments of sets of clusters 200A-D, which are formed by respective clustering procedures. The third set of clusters 200A has four clusters. Also, the fourth set of clusters 200B, the fifth set of clusters 200C, and the sixth set of clusters 200D each include three clusters.

The sets of clusters may be compared (e.g., compared to the second set of clusters 100B, which was formed according to the labels; compared to one another) to evaluate the effectiveness of the clustering procedures and/or the respective visual vocabularies of the clustering procedures relative to the object labels. The concept of visual words and visual vocabularies relates to the quantization of features extracted from images. Typically the visual words are formed from image features (e.g., local image features), such as SIFT and its variants. The visual words can be thought of as groups of similar image features. By grouping image features, an image can be analyzed much in the same way that text documents are analyzed by their word contents. However, comparisons of the sets of clusters that assume that labels are distinct and mutually exclusive cannot judge whether the quality of a visual vocabulary that confuses the categories of dog and wolf is better than a visual vocabulary that has the same degree of confusion between dog and car. Thus, the relationship between the labels may be considered. The relationship between the labels may be described according to an ontology 190.

Figure 3:
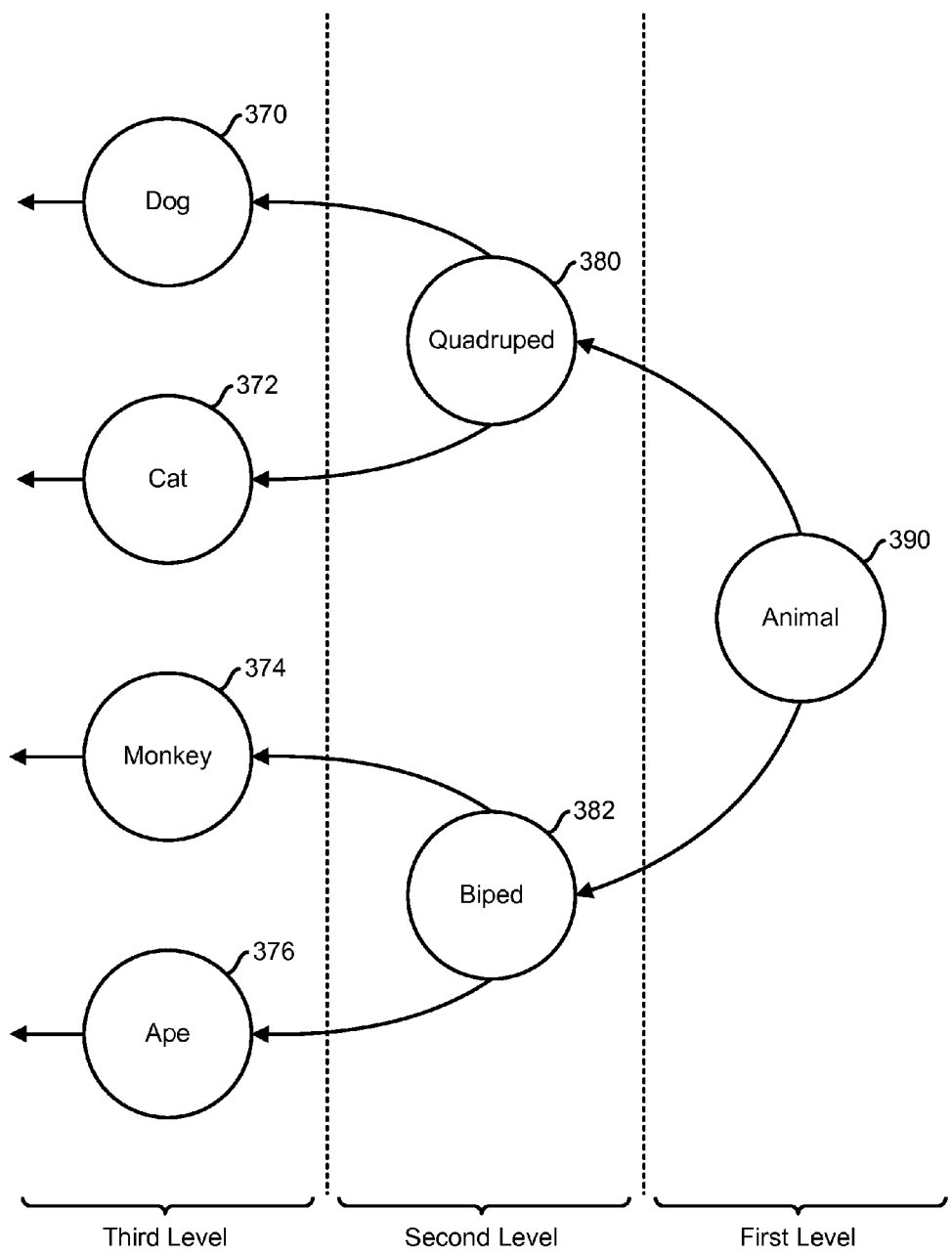
FIG. 3 illustrates an example embodiment of an ontology.

FIG. 3 illustrates an example embodiment of an ontology (e.g., taxonomy), which defines a hierarchical relationship among labels. The first level of the hierarchy of object labels includes "animal" 390. The second level in the hierarchy of object labels includes "quadruped" 380 and "biped" 382. The third level includes "dog" 370, "cat" 372, "monkey" 374, and "ape" 376. FIG. 4 illustrates an example embodiment of a similarity-like matrix generated from the ontology in FIG. 3, where the value in each cell of the matrix is the depth of the tree of the most common parent. For example, in FIG. 3 "dog" and "dog" have a most common parent of "dog," which is on level 3. "Dog" and "cat" have a most common parent of "quadruped," which is on level 2. "Ape" and "cat" have a most common parent node of "animal," which is on level 1. In one embodiment, to generate a similarity score (a score ranging from zero to 1), which indicates relative similarity between two labels, the maximum depth of the two labels being compared is used as a divisor of the similarity-like matrix elements. A similarity matrix can then be generated from the similarity-like matrix in FIG. 4, as illustrated by a first similarity matrix 595 in FIG. 5.

There are many more embodiments of methods for generating a similarity score from an ontology. For example, in one embodiment, a label distance is defined and the similarity score is generated using a Gaussian kernel. In this embodiment, the similarity score between label i and label j is generated (e.g., calculated) according to $$s(i, j) = \exp\left(\frac{-d(i, j)^2}{2\sigma^2}\right),$$

where d is the given label distance, and σ is some kernel width constant. The second similarity matrix 596 of FIG. 5 is generated using this example when d(i,j)=depth(i)+depth(j)−2*SL(i,j), where d(i,j) is the distance between row i and column j (corresponding to the distance between label i and label j), depth(i) and depth(j) are the respective node depths of label i and label j, SL(i, j) is the similarity-like measure between label i and label j, and $2\sigma^2$ is set to 8. Once generated, a similarity matrix may be used to generate a similarity measure for two sets of clusters.

Some embodiments use the Rand index to generate a similarity measure between two sets of clusters. The Rand Index is a pair counting strategy that considers all pairs of objects being clustered. The Rand Index is defined as $$RI = \frac{N_{00} + N_{11}}{N_{00} + N_{01} + N_{10} + N_{11}} = \frac{N_{00} + N_{11}}{\binom{N}{2}},$$

where there are N items being clustered, $N_{00}$ is the number of pairs of items that are in different clusters and assigned different labels, $N_{10}$ is the number of pairs that are in the same cluster but have different labels, $N_{01}$ is the number of pairs that are in different clusters but have the same label, and $N_{11}$ is the number of pairs that are in the same cluster and that have the same label.

Figure 6:
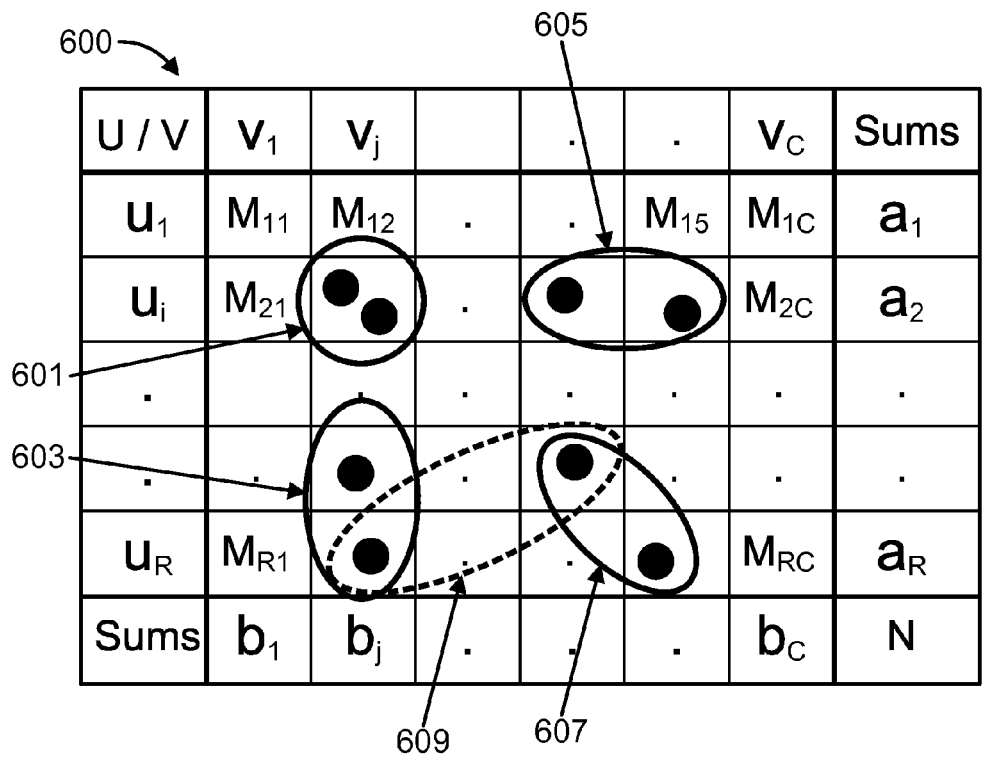

FIG. 6 illustrates an example embodiment of pair counting in a contingency table 600. A contingency table illustrates the counts of objects in each cluster in a first set of clusters (shown by the column) and in each cluster of a second set of clusters (shown by the rows). Thus, for N number of objects, a first set of C number of clusters includes clusters V1, V2, . . . VC, which respectively have b1, b2, . . . bC number of objects. Also, a second set of R number of clusters includes clusters U1, U2, . . . UR, which respectively have a1, a2, . . . aR number of objects. Assuming that the second set of clusters (U1, U2, . . . UR) corresponds to object labels, a first pair 601 is a pair of objects that have the same cluster and the same label, and the pair is one count for $N_{11}$. A second pair 603 is a pair of objects that have the same cluster but different labels (a count for $N_{10}$). A third pair 605 is a pair of objects that have the same label but different clusters (a count for $N_{01}$). And a fourth pair 607 is a pair of objects that have different clusters and different labels (a count for $N_{00}$). Thus, from the pairs 601, 603, 605, and 607, the following pair counts are tabulated: $N_{11}$ has 1, $N_{01}$ has 1, $N_{10}$ has 1, and $N_{00}$ has 1. Also, the table 600 as shown includes other pairs of objects (8 choose 2=28 total, since each of the eight objects is paired with every other object). For example, pair 609 is another count for $N_{00}$. Thus, when the entire table 600 is considered, the totals for some of the pair counts are higher than 1. For example, $N_{00}$, which includes pair 607 and pair 609, includes more than 10 counts.

Considering the relationship between some of the labels, which are defined by the ontology (e.g., as shown in a similarity matrix), in some embodiments the counts of pairs may not just include integer counts, but may include partial counts. For example, the Rand Index count may be modified as follows: For every possible pair of objects, if the objects in a selected pair of objects, respectively labeled {i, j}, are in different clusters, then increment $N_{00}$ by 1−s(i,j), and increment $N_{01}$ by s(i, j). Else if the objects in the pair of objects are in the same cluster, then increment $N_{10}$ by 1−s(i, j) and increment $N_{11}$ by s(i, j).

The count $N_{11}$ can be calculated as follows: In the case of $N_{11}$, the two objects are chosen from the same column. Consider the objects in the j-th column. It is possible to select $$\binom{b_j}{2}$$

different combinations of pairs from this column, where $b_j$ is the number of objects in the column. The probability of the first object being in the i-th row is $$\frac{M_{ij}}{b_j},$$

where $M_{ij}$ is the number of objects shared by row i and column j. When the first object and the second object are in the same column, the probability of the second object being in any other row k is $$\frac{M_{kj}}{b_j - 1},$$

and the probability of the second object being in row i like the first object is $$\frac{M_{ij} - 1}{b_j - 1}.$$

Thus, $$N_{11} = \sum_{j=1}^{C} \binom{b_j}{2} \sum_{i=1}^{R} \frac{M_{ij}}{b_j} \left\{ \left[ \sum_{k=1}^{R} \frac{M_{kj}}{(b_j - 1)} s_{ik} \right] - \frac{1}{b_j - 1} s_{ii} \right\}.$$

Figure 7:
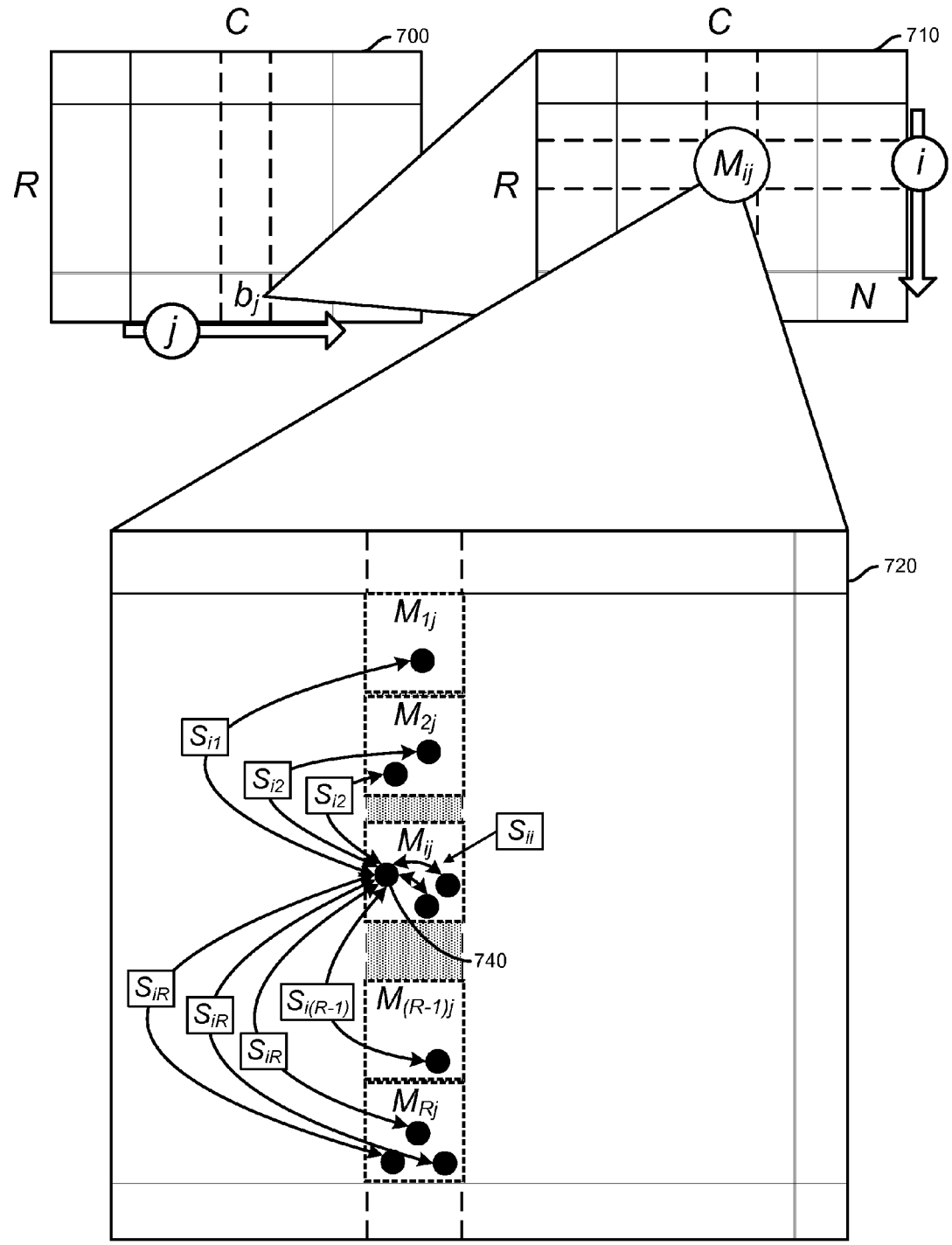
FIG. 7 illustrates an example embodiment of pair counting in a contingency table.

FIG. 7 illustrates an example embodiment of pair counting to generate $N_{11}$. As shown by table 700, at the outermost level flow proceeds across the columns, where $b_j$ is the number of objects in column j. Next, as shown in table 710, flow proceeds across the rows, where $M_{ij}$ is the number of objects shared by row i and column j. Then, as shown in table 720, each object in $M_{ij}$ is used as a first half of a pair of objects to form respective pairs that, collectively, use all of the other objects in column j as the second half of the pair of objects. For example, object 740 is used to form respective pairs with the other nine objects in the column. The similarity scores of the pairs are shown as $S_{ik}$, where i is the row of object 740 and k is the row of the second object in the pair. Since all objects in a row have the same label, all objects in a row have the same similarity score relative to object 740. For example, all three objects in row R have the same similarity score, $S_{iR}$, relative to object 740 (which is in row i).

Figure 8:
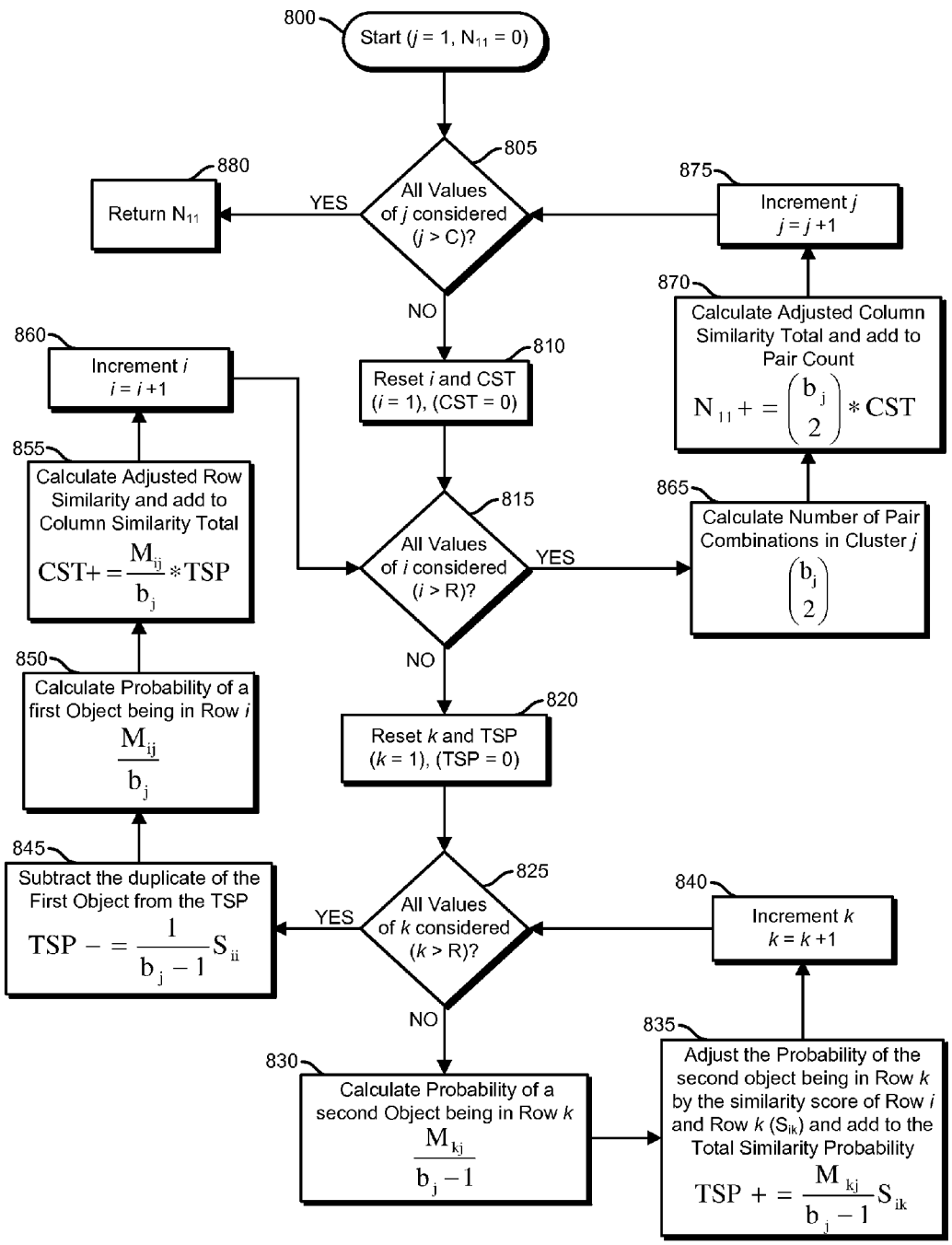
FIG. 8 is a block diagram that illustrates an example embodiment of a method for generating a pair count.

FIG. 8 is a block diagram that illustrates an example embodiment of a method for generating a pair count. Other embodiments of this method and the other methods described herein may omit blocks, add blocks, change the order of the blocks, combine blocks, and/or divide blocks into separate blocks. Also, the methods described herein may be implemented by the systems and devices described herein. Flow starts in block 800, where $N_{11}$ is set to 0 and j is set to 1. Flow proceeds to block 805, where it is determined if all values of j have been considered (which indicates if all C columns have been considered). If yes, flow moves to block 880, where $N_{11}$ is returned. If not, flow proceeds to block 810, where i is set to 1 and the Column Similarity Total (also referred to herein as "CST") is set to 0.

Next, in block 815, it is determined if all values of i have been considered. If not, flow proceeds to block 820, where k is set to 1 and the Total Similarity Probability (also referred to as "TSP") is set to 0. Flow then moves to block 825, where it is determined if all values of k have been considered. If not, flow proceeds to block 830, where the probability of a second object being in row k is calculated. The probability of the second object being in row k is given by $$\frac{M_{kj}}{b_j - 1}.$$

Next, in block 835, the probability of the second object being in row k is adjusted based on the similarity score of row i and row k, and the adjusted probability is added to the TSP. Flow proceeds to block 840, where k is incremented, and then flow returns to block 825.

If in block 825 all values of k have been considered, then flow proceeds to block 845. In block 845, the duplicate of the first object is subtracted from the TSP. Note that blocks 825 through 840 pair a first object with all other objects in the same column, including the first object itself. This pairing of the first object with itself (the pair is first object/first object) is removed in block 845. Flow then proceeds to block 850, where the probability of a first object being in row i is calculated, for example according to $$\frac{M_{ij}}{b_j}.$$

Next, in block 855, the TSP is adjusted based on the probability of the first object being in row i, and the adjusted TSP is added to the CST. In block 860, i is incremented, and flow then returns to block 815. If in block 815 all values of i have been considered (which indicates all R rows have been considered), then flow proceeds to block 865.

In block 865, the number of pair combinations in cluster j is calculated, which may be given by $$\binom{b_j}{2}.$$

Next, in block 870, the CST is adjusted according to the number of pair combinations in cluster j and is added to the pair count $N_{11}$. In block 875, j is incremented, and then flow returns to block 805. As explained above, if in block 805 all values of j have been considered, then flow proceeds to block 880, where $N_{11}$ is returned.

However, the equation used to calculate $N_{11}$ can be simplified:

$$N_{11} = \frac{1}{2} \sum_{j=1}^{C} \sum_{i=1}^{R} M_{ij} \left\{ \left[ \sum_{k=1}^{R} M_{kj} s_{ik} \right] - s_{ii} \right\}$$

$$= \frac{1}{2} \left[ \sum_{j=1}^{C} \sum_{i=1}^{R} M_{ij} \sum_{k=1}^{R} M_{kj} s_{ik} \right] - \frac{1}{2} \left[ \sum_{j=1}^{C} \sum_{i=1}^{R} M_{ij} s_{ii} \right]$$

$$= \frac{1}{2} \left[ \sum_{j=1}^{C} \sum_{i=1}^{R} M_{ij} \sum_{k=1}^{R} M_{kj} s_{ik} \right] - \frac{1}{2} a^T \mathrm{diag}(S),$$

where a is the vector of row sums of M, and S is a similarity matrix. Note that the diagonal of the similarity matrix S may be a vector of ones. Also let the j-th column of M be defined as $\alpha_j$. Then in matrix and vector notation, $$N_{11} = \frac{1}{2} \sum_{j=1}^{C} \alpha_j^T S \alpha_j - \frac{1}{2} N.$$

Figure 9:
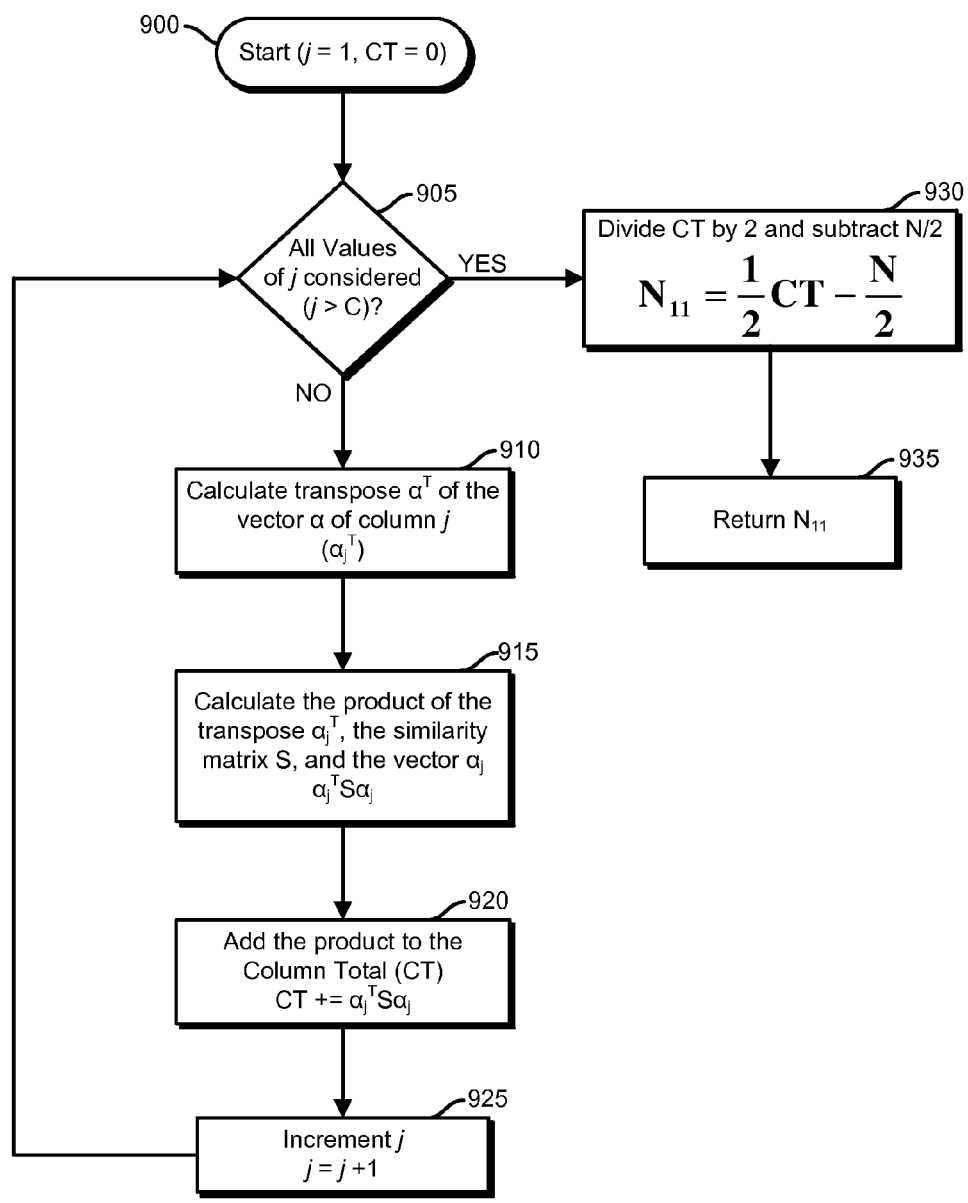
FIG. 9 is a block diagram that illustrates an example embodiment of a method for generating a pair count.

FIG. 9 is a block diagram that illustrates an example embodiment of a method for generating a pair count. The method assumes that the diagonal of the similarity matrix S is a vector of ones. Flow starts in block 900, where j is set to 1 and the column total ("CT") is set to 0. Next, in block 905, it is determined if all values of j have been considered (which indicates if all C columns have been considered). If not, flow proceeds to block 910, where the transpose $\alpha_j^T$ of the vector $\alpha_j$ of the j-th column is calculated. Next, in block 915, the product of the transpose $\alpha_j^T$, the similarity matrix S, and the vector $\alpha_j$ is calculated, and in block 920 the product is added to CT. Then in block 925, j is incremented, and flow then returns to block 905. If in block 905 it is determined that all values of j have been considered, then flow moves to block 930. In block 930, $N_{11}$ is calculated by dividing CT by two and subtracting N/2. Finally, in block 935, $N_{11}$ is returned.

In addition to considering $N_{11}$, the Rand index also considers $N_{00}$. $N_{00}$ may be calculated as follows: For $N_{00}$, the pair of objects is chosen from different columns, and thus, if the first object is chosen from column j, then the second object must be from a different column. Therefore there are $$\frac{b_j(N - b_j)}{2}$$

such combinations. The probability of the first object being in the i-th row is $$\frac{M_{ij}}{b_j}.$$

When the second object and the first object are in different columns, the probability of the second object being in row k is $$\frac{a_k - M_{kj}}{N - b_j}.$$

Thus, $$N_{00} = \frac{1}{2}\sum_{j=1}^{C} b_j(N-b_j) \sum_{i=1}^{R} \frac{M_{ij}}{b_j} \sum_{k=1}^{R} \frac{a_k - M_{kj}}{N - b_j}(1 - s_{ik}).$$

Figure 10:
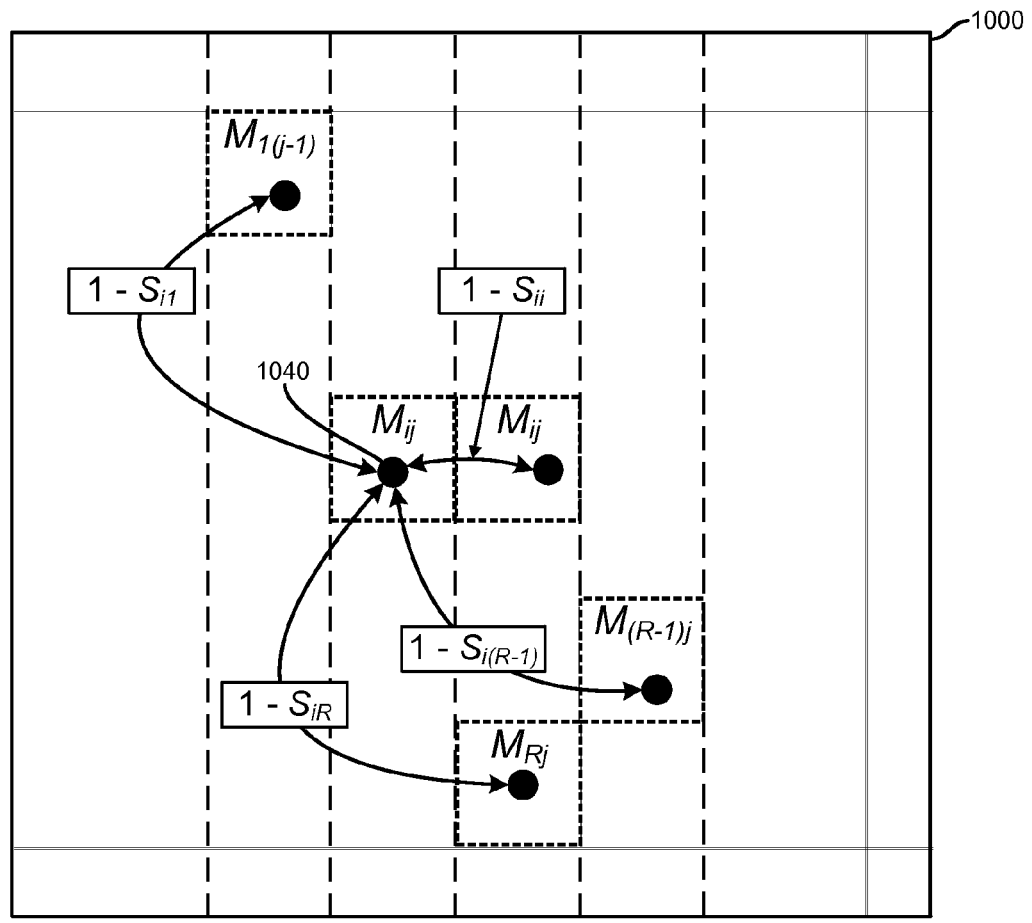
FIG. 10 illustrates an example embodiment of pair counting in a contingency table.

FIG. 10 illustrates an example embodiment of pair counting in a contingency table to calculate $N_{00}$. As shown in table 1000, each object in $M_{ij}$ is used as a first half of a pair of objects to form respective pairs that, collectively, use all of the other objects that are not in column j as the second half of the pair of objects. For example, object 1040 is used to form respective pairs with the other four objects that are not in column j. The similarity scores of the pairs are shown as $1-S_{ik}$, where i is the row of object 1040 and k is the row of the second object in the pair.

Figure 11:
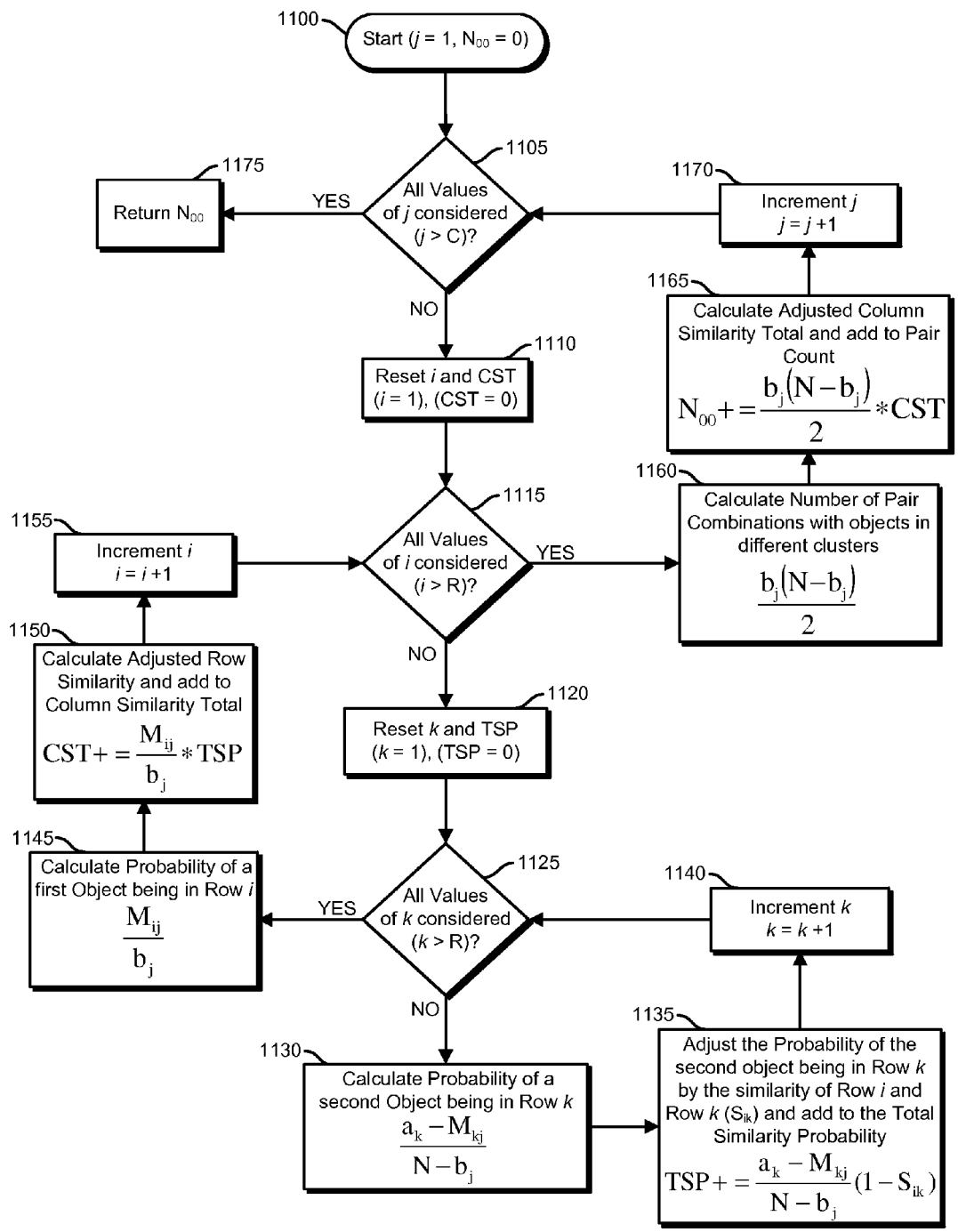
FIG. 11 is a block diagram that illustrates an example embodiment of a method for generating a pair count.

FIG. 11 is a block diagram that illustrates an example embodiment of a method for generating a pair count. Flow starts in block 1100, where $N_{00}$ is set to 0 and j is set to 1. Flow proceeds to block 1105, where it is determined if all values of j have been considered (which indicates if all C columns have been considered). If yes, flow moves to block 1175, where $N_{00}$ is returned. If not, flow proceeds to block 1110, where i is set to 1 and the Column Similarity Total (also referred to herein as "CST") is set to 0.

Next, in block 1115, it is determined if all values of i have been considered (which indicates if all R rows have been considered). If not, flow proceeds to block 1120, where k is set to 1 and the Total Similarity Probability (also referred to as "TSP") is set to 0. Flow then moves to block 1125, where it is determined if all values of k have been considered (which indicates if all R rows have been considered). If not, flow proceeds to block 1130, where the probability of a second object being in row k is calculated. The probability of the second object being in row k is given by $$\frac{a_k - M_{kj}}{N - b_j}.$$

Next, in block 1135, the probability of the second object being in row k is adjusted based on the similarity score of row i and row k (e.g., by $1-S_{ik}$), and the adjusted probability is added to the TSP. Flow proceeds to block 1140, where k is incremented, and then flow returns to block 1125.

If in block 1125 all values of k have been considered, then flow proceeds to block 1145. In block 1145, the probability of a first object being in row i is calculated, for example according to $$\frac{M_{ij}}{b_j}.$$

Next, in block 1150, the TSP is adjusted based on the probability of the first object being in row i, and the adjusted TSP is added to the CST. In block 1155, i is incremented, and flow then returns to block 1115. If in block 1115 all values of i have been considered, then flow proceeds to block 1160.

In block 1160, the number of pair combinations with objects in different clusters is calculated, which may be given by $$\frac{b_j(N - b_j)}{2}.$$

Next, in block 1165, the CST is adjusted according to the number of pair combinations and is added to the pair count $N_{00}$. In block 1170, j is incremented, and then flow returns to block 1105. As explained above, if in block 1105 all values of j have been considered, then flow proceeds to block 1175, where $N_{00}$ is returned.

However, the equation used to calculate $N_{00}$ can be simplified:

$$N_{00} = \frac{1}{2}\sum_{j=1}^{C} b_j(N-b_j) \sum_{i=1}^{R} \frac{M_{ij}}{b_j} \sum_{k=1}^{R} \frac{a_k - M_{kj}}{N - b_j}(1 - s_{ik})$$

$$= \frac{1}{2}\sum_{j=1}^{C}\sum_{i=1}^{R}\sum_{k=1}^{R}[M_{ij}a_k(1-s_{ik}) - M_{ij}M_{kj}(1-s_{ik})]$$

$$= \frac{1}{2}a^T(1-S)a - \frac{1}{2}\sum_{j=1}^{C}\alpha_j^T(1-S)\alpha_j,$$

where 1 is a matrix of all ones the size of S. This may be further simplified:

$$N_{00} = \frac{1}{2}\left[N^2 - a^T Sa - \sum_{j=1}^{C} b_j^2 + \sum_{j=1}^{C}\alpha_j^T S\alpha_j\right]$$

$$= \frac{1}{2}\left[N^2 - a^T Sa - b^T b + \sum_{j=1}^{C}\alpha_j^T S\alpha_j\right],$$

where a is the vector of row sums, b is the vector of column sums, and $\alpha_j$ is the vector of column j.

Figure 12:
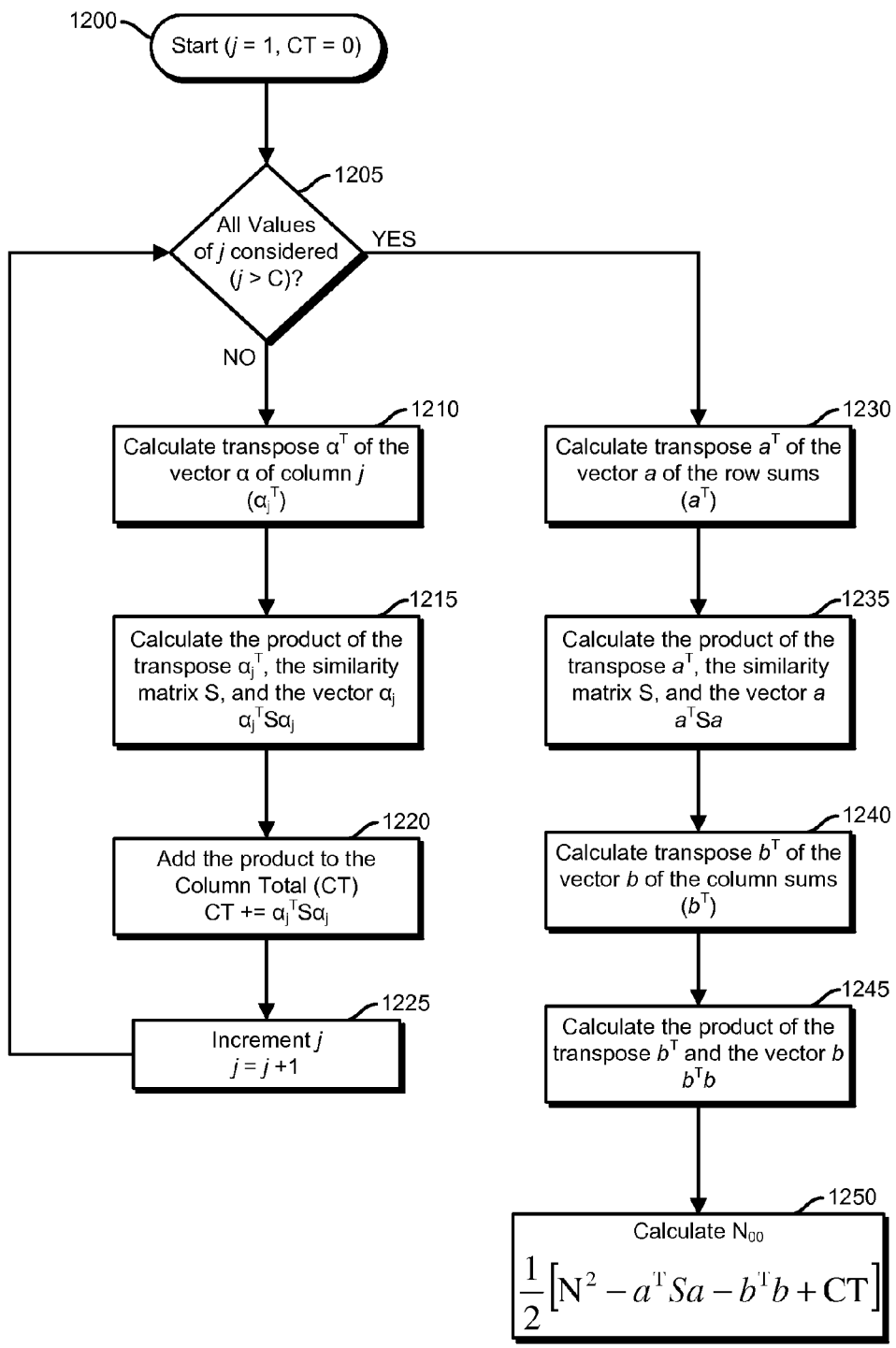
FIG. 12 is a block diagram that illustrates an example embodiment of a method for generating a pair count.

FIG. 12 is a block diagram that illustrates an example embodiment of a method for generating a pair count. The method assumes that the diagonal of the similarity matrix S is a vector of ones. Flow starts in block 1200, where j is set to 1 and the column total ("CT") is set to 0. Next, in block 1205, it is determined if all values of j have been considered (which indicates if all J columns have been considered). If not, flow proceeds to block 1210, where the transpose $\alpha_j^T$ of the vector $\alpha_j$ of the j-th column is calculated. Next, in block 1215, the product of the transpose $\alpha_j^T$, the similarity matrix S, and the vector $\alpha_j$ is calculated, and in block 1220 the product is added to CT. Then in block 1225, j is incremented, and flow then returns to block 1205. If in block 1205 it is determined that all values of j have been considered, then flow moves to block 1230. In block 1230, the transpose $a^T$ of the vector a (the vector of row sums) is calculated. Next, in block 1235, the product of the transpose $a^T$, the similarity matrix S, and the vector $a^T$ is calculated. The flow proceeds to block 1240, where the transpose $b^T$ of the vector b (the vector of column sums) is calculated, and in block 1245 the product of the transpose $b^T$ and b is calculated. Finally, in block 1250, $N_{00}$ is calculated according to $$N_{00} = \frac{1}{2}[N^2 - a^T S a - b^T b + CT].$$

Additionally, since the Rand Index is given by $$RRI = \frac{N_{00} + N_{00}}{N_{00} + N_{01} + N_{10} + N_{11}},$$

and since $N_{00}+N_{01}+N_{10}+N_{11}$ is $$\binom{N}{2},$$

the total number of pairs that can be chosen, the Relational Rand Index can be calculated according to $$RRI = \frac{N^2 - N - a^T S a - b^T b + 2\sum_{j=1}^{C} \alpha_j^T S \alpha_j}{N(N-1)}.$$

Thus, the RRI can be efficiently calculated given a relation matrix S and a contingency table M. Also, if S is the identity matrix, the RRI simplifies to the Rand Index:

$$RI = \frac{N^2 - N - \sum_{i=1}^{R} a_i^2 - \sum_{j=1}^{C} b_j^2 + 2\sum_{i=1}^{R}\sum_{j=1}^{C} n_{ij}^2}{N(N-1)}.$$

FIG. 13 illustrates example embodiments of contingency tables and a similarity matrix that are generated based on the examples clusters, ontologies, and similarity matrixes of FIG. 1 to FIG. 5. A first contingency table 1300 represents the third set of clusters 200A shown in FIG. 2. The first contingency table 1300 includes four columns (one per cluster) and seven rows (one per each label in the ontology shown in FIG. 3), and thus may be represented by a 7×4 matrix. Additionally, the transpose of the 7×4 matrix is a 4×7 matrix. Also, the second similarity matrix 596 shown in FIG. 5, which is based on the ontology of FIG. 3, is a 7×7 matrix. Therefore, the first contingency table 1300 and the second similarity matrix 596 may be used to implement the aforementioned methods. However, the first contingency table 1300 and the second similarity matrix 596 may be simplified. Since the only labels that are applicable to the clusters associated with the first contingency table 1300 are "dog," "cat," and "monkey," the second similarity matrix 596 may be simplified to remove the other labels. The resulting similarity matrix 1395 is a 3×3 matrix. Additionally, the first contingency table 1300 can be simplified to remove the non-applicable labels, and the resulting contingency table 1301 is a 3×4 matrix (which has a 4×3 transpose). Therefore, the resulting contingency table 1301 and the resulting similarity matrix 1395 can also be used to implement the aforementioned methods.

FIG. 14 illustrates example embodiments of contingency tables. A second contingency table 1400 represents the fourth set of clusters 200B in FIG. 2. A third contingency table 1401 represents the fifth set of clusters 200C in FIG. 2. And a fourth contingency table 1402 represents the sixth set of clusters 200D in FIG. 2.

When the first similarity matrix 595 is used to calculate a similarity index (e.g., the RRI), the similarity index for the first set of clusters 100A is 0.527. The similarity index for the third set of clusters 200A is 0.6317. The similarity index for the fourth set of clusters 200B is 0.6762. The similarity index for the fifth set of clusters 200C is 0.6413. Finally, the similarity index for the sixth set of clusters 200D is 0.6698. Also, when the second similarity matrix 596 (or resulting similarity matrix 1395) is used to calculate a similarity index (e.g., the RRI), the similarity index for the first set of clusters 100A is 0.6145. The similarity index for the third set of clusters 200A is 0.7366. The similarity index for the fourth set of clusters 200B is 0.7821. The similarity index for the fifth set of clusters 200C is 0.7368. Finally, the similarity index for the sixth set of clusters 200D is 0.7714. The similarity indexes are also shown in the first table 2501 in FIG. 25. Therefore, the similarity index will vary depending on the ontology and on the similarity matrix used to generate the similarity index.

Figure 15:
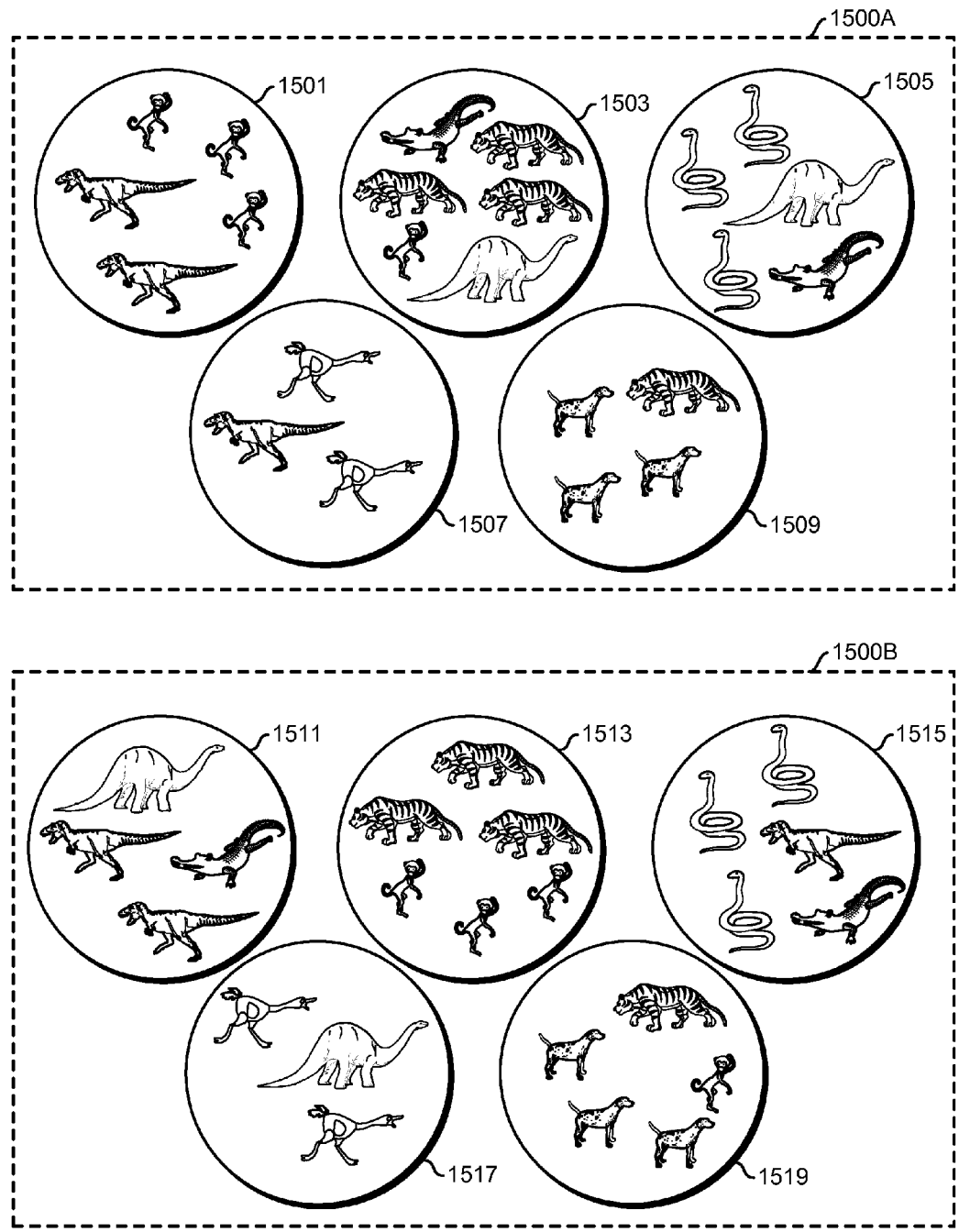
FIG. 15 illustrates example embodiments of sets of clusters.
Figure 16:
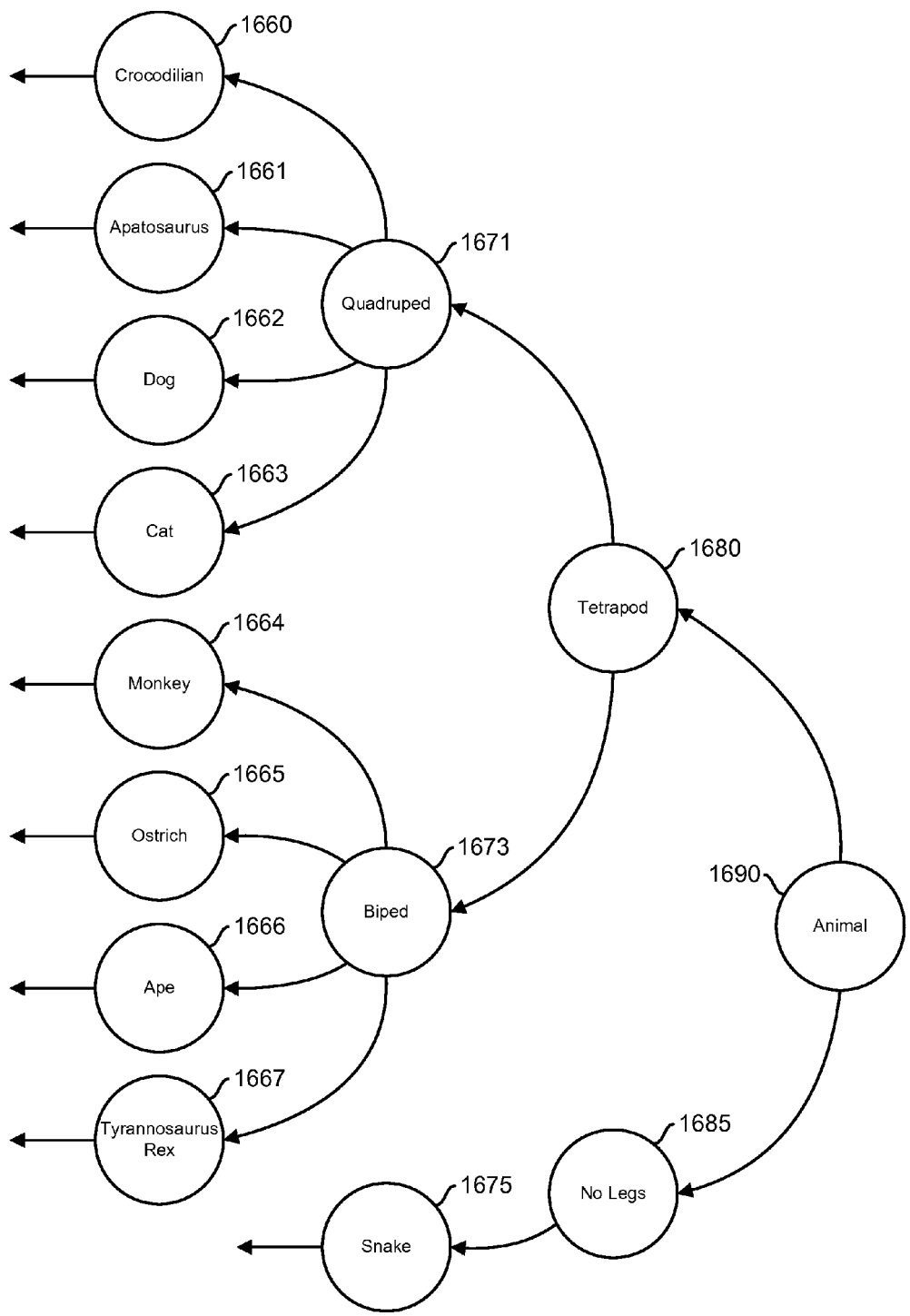
FIG. 16 illustrates an example embodiment of an ontology.

FIG. 15 illustrates example embodiments of sets of clusters 1500A-B. The first set of clusters 1500A includes 5 clusters, clusters 1501-1509. Also, the second set of clusters 1500B includes 5 clusters, clusters 1511-1519. FIG. 16 illustrates an example embodiment of an ontology that includes the objects shown in FIG. 15. The first level of the ontology includes "animal" 1690; the second level includes "tetrapod" 1680 and "no legs" 1685; and the third level includes "quadruped" 1671, "biped" 1673, and "snake" 1675. Finally, the fourth level includes "crocodilian" 1660, "Apatosaurus" 1661, "dog" 1662, "cat" 1663, "monkey" 1664, "ostrich" 1665, "ape" 1666, and "Tyrannosaurus Rex" 1667. Also, FIG. 17 illustrates an example embodiment of a similarity matrix that is based on the ontology of FIG. 16.

Figure 18:
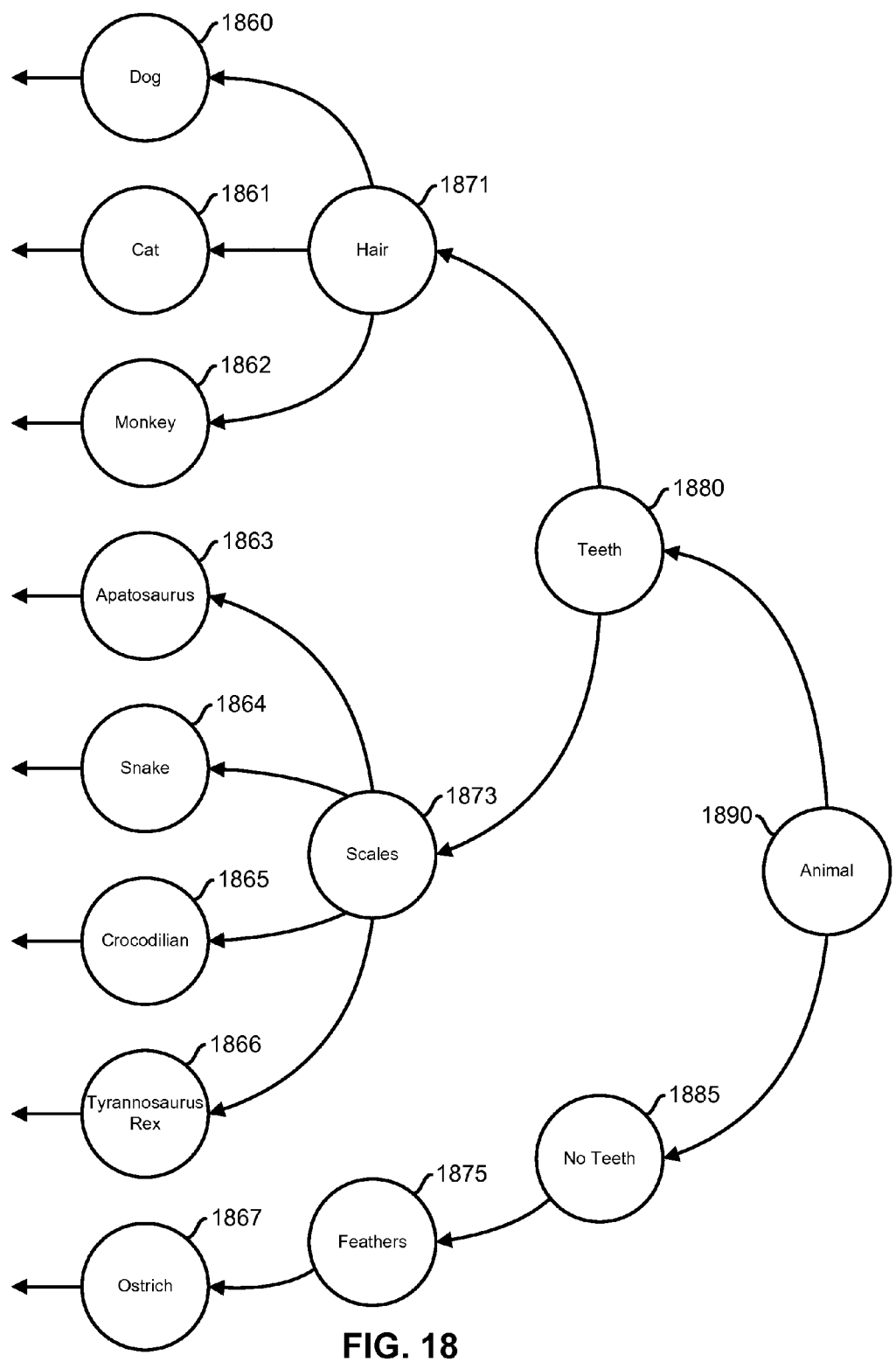
FIG. 18 illustrates an example embodiment of an ontology.

Additionally, FIG. 18 illustrates an example embodiment of an ontology. The ontology of FIG. 18 includes the same labels "crocodilian," "Apatosaurus," "dog," "cat," "monkey," "ostrich," "snake," "Tyrannosaurus Rex," and "animal" as the ontology of FIG. 16. However, the ontologies define different relationships among the labels. FIG. 19 illustrates an example embodiment of a similarity matrix that is based on the ontology shown in FIG. 18.

Using the similarity matrix of FIG. 17, the similarity index for the first set of clusters 1500A is 0.5237, and the similarity index for the second set of clusters 1500B is 0.4941. Also, using the similarity matrix of FIG. 19, the similarity index for the first set of clusters 1500A is 0.497, and the similarity index for the second set of clusters 1500B is 0.5247. The similarity indexes are also shown in the second table 2502 in FIG. 25. Thus, depending on the ontology and similarity matrix, either the first set of clusters 1500A or the second set of clusters 1500B may have a higher similarity index than the other.

Figure 20:
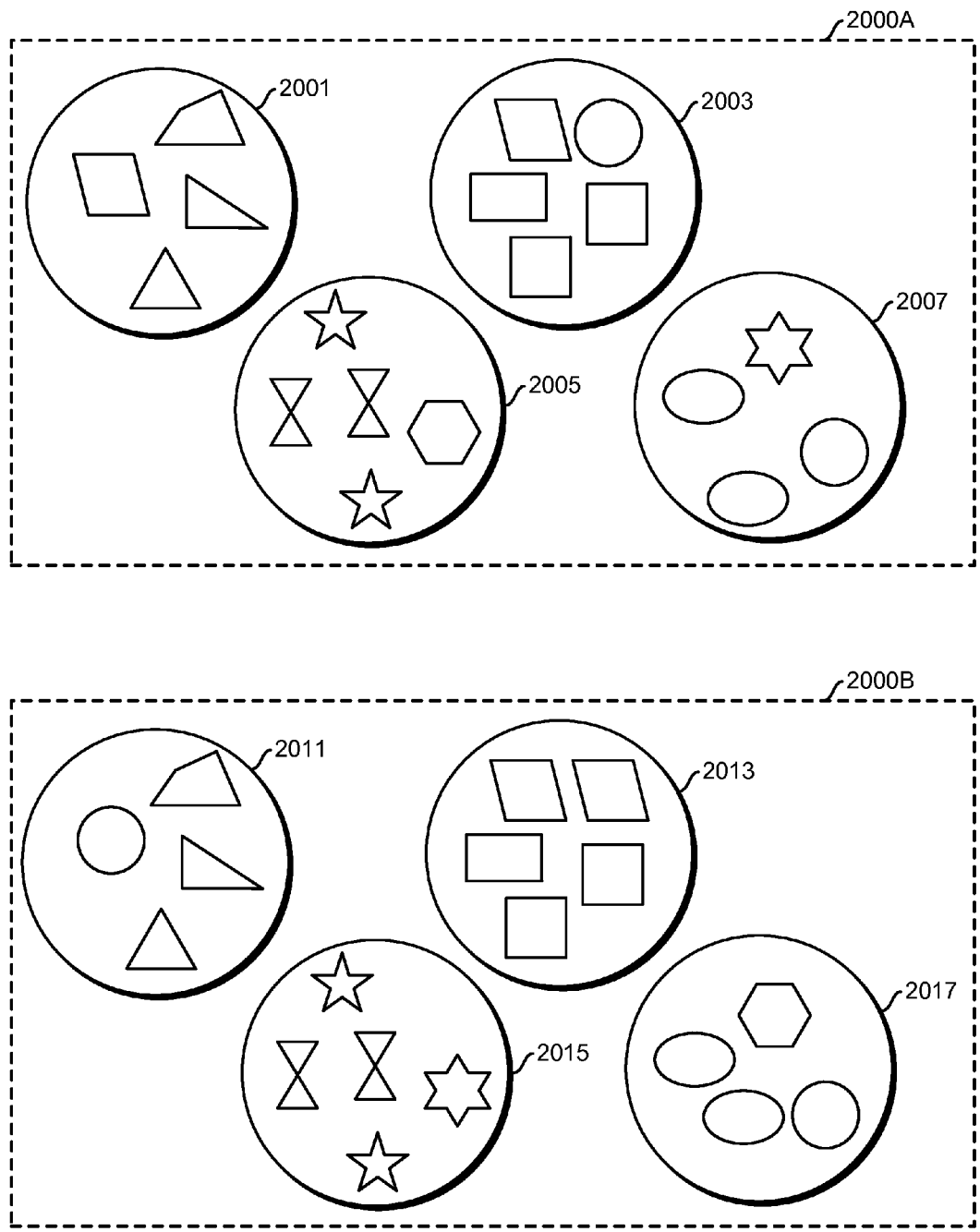
FIG. 20 illustrates example embodiments of sets of clusters.
Figure 21:
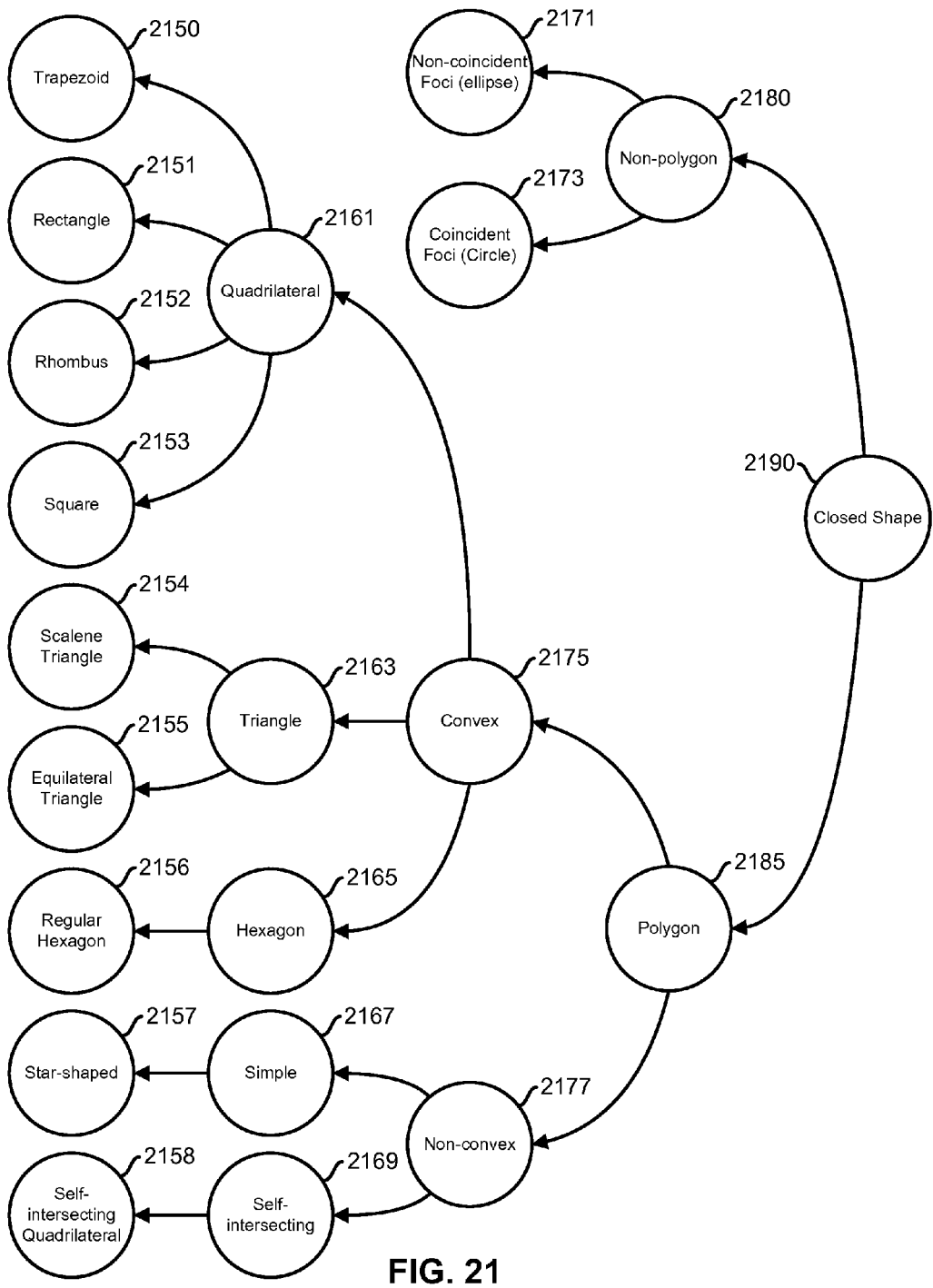
FIG. 21 illustrates an example embodiment of an ontology.

FIG. 20 illustrates example embodiments of sets of clusters, a first set of clusters 2000A, which includes clusters 2001-2007, and a second set of clusters 2000B, which includes clusters 2011-2017. FIG. 21 illustrates an example embodiment of an ontology of the objects in the clusters in FIG. 20. The ontology includes five levels. The first level includes "closed shape" 2190. The second level includes "non-polygon" 2180 and "polygon" 2185. The third level includes "non-coincident foci (ellipse)" 2171, "coincident foci (circle)" 2173, "convex" 2175, and "non-convex" 2177. The fourth level includes "quadrilateral" 2161, "triangle" 2163, "hexagon" 2165, "simple" 2167, and "self-intersecting" 2169. Finally, the fifth level includes "trapezoid" 2150, "rectangle" 2151, "rhombus" 2152, "square" 2153, "scalene triangle" 2154, "equilateral triangle" 2155, "regular hexagon" 2156, "star-shaped" 2157, and "self-intersecting quadrilateral" 2158. FIG. 22 illustrates an example embodiment of a similarity matrix 2200 that is based on the ontology of FIG. 21.

Based on the first set of clusters 2000A and the similarity matrix 2200, the similarity index of the first set of clusters 2000A is 0.6. Also, based on the second set of clusters 2000B and the similarity matrix 2200, the similarity index of the second set of clusters 2000B is 0.6366. The similarity indexes are also shown in the third table 2503 in FIG. 25.

Figure 23:
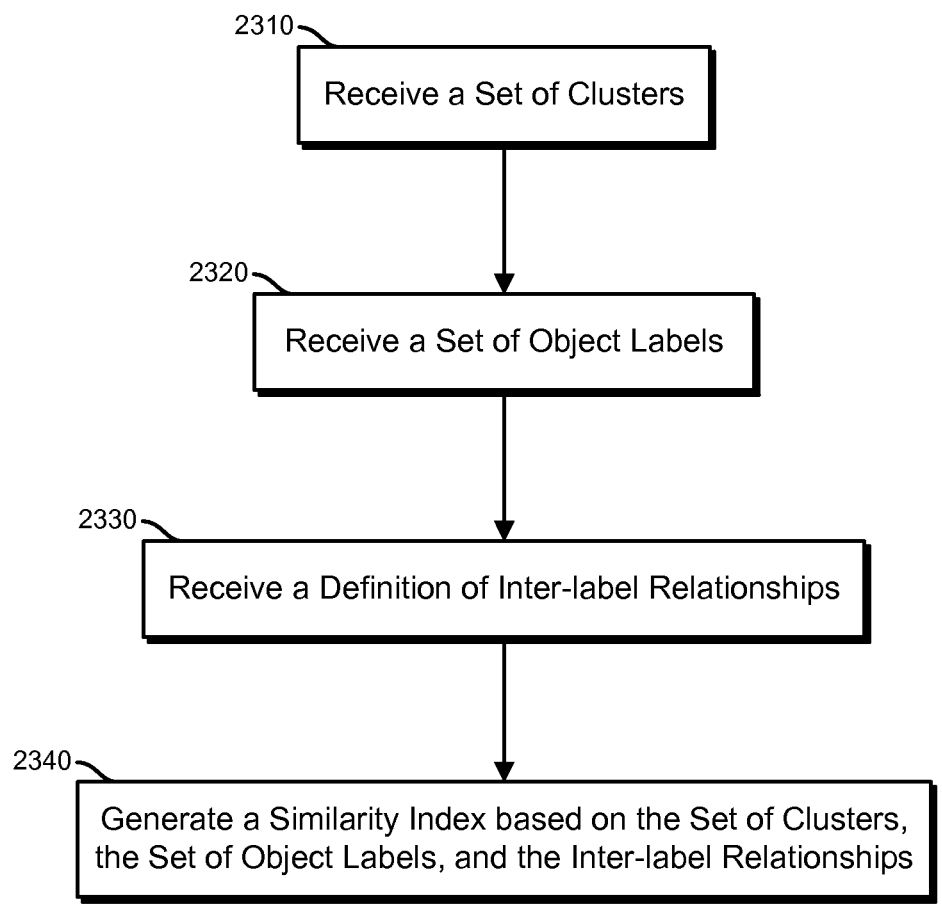
FIG. 23 is a block diagram that illustrates an example embodiment of a method for generating a similarity index.

FIG. 23 is a block diagram that illustrates an example embodiment of a method for generating a similarity index. First, in block 2310, a set of clusters of objects is received. For example, a computing device may receive a set of clusters from another computing device or retrieve a set of clusters from a computer-readable medium. Next, in block 2320, a set of object labels (e.g., semantic labels) is received, and in block 2330, a definition of inter-label relationships (e.g., a similarity matrix, an ontology) is received. The object labels and the definition of inter-label relationships may also be received from another computing device or retrieved from a computer-readable medium. Finally, in block 2340, a similarity index is generated based on the set of clusters, the set of object labels, and the inter-label relationships. For example, the similarity index may be a Relational Rand Index.

Additionally, a baseline may be used to evaluate sets of clusters, for example by generating an adjusted similarity index. Systems and methods for generating an adjusted similarity index are described in WO/2012/054399, by Bradley Denney and Anoop Korattikara-Balan, and in WO/2012/054352, by Bradley Denney and Anoop Korattikara-Balan, which are incorporated by reference. To generate adjusted similarity indexes, the similarity indexes for the sets of clusters are adjusted by the expected value of the similarity indexes that one would expect to obtain using a randomly generated set of clusters. Thus, in some embodiments, the expected value of the similarity index is used as a baseline when evaluating a similarity index. Additionally, a normalization may be performed to an adjusted similarity index. Also, if one set of clusters, for example a set of clusters formed using object labels, is assumed to be a ground truth, the similarity index may be used as a cluster quality measure, which measures the quality of a set of clusters relative to the ground truth. Some adjusted similarity indexes (e.g., quality measures) $\varphi$, given contingency table M, class relation matrix S, and normalization constant K, can be calculated according to $$\varphi_{adj}(M; S) = \frac{\varphi(M; S) - E[\varphi(M; S)]}{K}.$$

Embodiments for calculating the expected value (also referred to herein as "the expectation") may 1) calculate the expectation given fixed marginals (i.e., the expectation over M given fixed row sums a and column sums b), or 2) calculate the expectation given fixed row sums a and varying column sums b.

In embodiments that calculate the expected value given fixed marginals (e.g., fixed row sums and fixed column sums), $$E_{M|a,b}[\varphi(M; S)] = \frac{N^2 - N - a^T S a - b^T b + 2\sum_{j=1}^{C} E_{M|a,b}[\alpha_j^T S \alpha_j]}{N(N-1)}.$$

Thus, $E_{M|a,b}[\alpha_j^T S \alpha_j]$ may be calculated according to $$E_{M|a,b}[\alpha_j^T S \alpha_j] = \sum_{i=1}^{R} \sum_{k=1}^{R} E[M_{ij} M_{kj}] s_{ik}.$$

Also, $M_{ij}$ may be described with the hypergeometric distribution given a and b. According to the hypergeometric distribution, $$E[M_{ij}] = \frac{a_i b_j}{N},$$

and $$E[M_{ij}^2] = \frac{a_i b_j}{N}\left[\frac{(a_i - 1)(b_j - 1)}{N - 1} + 1\right].$$

And from the joint hypergeometric distribution, $$E[M_{ij} M_{kj}] = \frac{a_i a_k b_j (b_j - 1)}{N(N-1)} \text{ for } i \neq k.$$

Therefore, the expectation of the term can be simplified as $$E_{M|a,b}[\alpha_j^T S \alpha_j] = \sum_{i=1}^{R} \sum_{k=1}^{R} E[M_{ij} M_{kj}] s_{ik}$$

$$= \sum_{i=1}^{R} \sum_{\substack{k=1 \\ k \neq i}}^{R} \frac{a_i a_k b_j (b_j - 1)}{N(N-1)} s_{ik} +$$

$$\sum_{i=1}^{R} \left[\frac{a_i b_j (a_i - 1)(b_j - 1)}{N(N-1)} + \frac{a_i b_j}{N}\right] s_{ii}.$$

This simplifies to $$E_{M|a,b}[\alpha_j^T S \alpha_j] = \sum_{i=1}^{R} \sum_{k=1}^{R} \frac{a_i a_k b_j (b_j - 1)}{N(N-1)} s_{ik} + \sum_{i=1}^{R} \left[\frac{a_i b_j}{N}\left(1 - \frac{(b_j - 1)}{(N-1)}\right)\right] s_{ii}.$$

This further simplifies to $$E_{M|a,b}[\alpha_j^T S \alpha_j] = \frac{b_j(b_j-1)}{N(N-1)} a^T S a + \frac{b_j}{N}\left(1 - \frac{(b_j-1)}{(N-1)}\right) a^T \text{diag}(S),$$

which leads to $$\sum_{j=1}^{C} E_{M|a,b}[\alpha_j^T S \alpha_j] = \frac{(a^T S a)(b^T b - N)}{N(N-1)} + a^T \text{diag}(S)\left[1 - \frac{(b^T b - N)}{N(N-1)}\right].$$

And since $s_{ii}$ is typically 1, this can be simplified further to $$\sum_{j=1}^{C} E_{M|a,b}[\alpha_j^T S \alpha_j] = \frac{(a^T S a)(b^T b - N)}{N(N-1)} + N\left[1 - \frac{(b^T b - N)}{N(N-1)}\right]$$

$$= \frac{(a^T S a - N)(b^T b - N)}{N(N-1)} + N.$$

This can be inserted into $$E_{M|a,b}[\varphi(M;S)] = \frac{N^2 - N - a^T S a - b^T b + 2\sum_{j=1}^{C} E_{M|a,b}[\alpha_j^T S \alpha_j]}{N(N-1)},$$

which can be used as a baseline to evaluate cluster quality.

For the fixed marginal embodiments, the adjusted similarity index (e.g., the Adjusted Relational Rand Index) may be calculated according to $$ARRI(M \mid a, b) = \frac{N^2 - N - a^T S a - b^T b + 2\sum_{j=1}^{C} \alpha_j^T S \alpha_j}{N(N-1)} - \frac{N^2 - N - a^T S a - b^T b + 2\sum_{j=1}^{C} E_{M|a,b}[\alpha_j^T S \alpha_j]}{N(N-1)}.$$

Many of these terms cancel out, and thus, for embodiments where all marginals are fixed, $$ARRI(M \mid a, b) \propto \sum_{j=1}^{C} \alpha_j^T S \alpha_j - \frac{(a^T S a - N)(b^T b - N)}{N(N-1)} - N.$$

Therefore, the adjusted similarity index (e.g., the ARRI) indicates a difference between a similarity index and the expected value of the similarity index.

In embodiments that use some fixed marginal and some variable marginal, for example fixed labels and random clusters (e.g., fixed row sums and variable column sums), to calculated the expectation given just the fixed row sums, an expectation over a is calculated according to $$E_b\{E_{M|a,b}[\varphi(M;S)]\} = \frac{N^2 - N - a^T S a - E_a[b^T b] + 2\sum_{j=1}^{C} E_b\{E_{M|a,b}[\alpha_j^T S \alpha_j]\}}{N(N-1)}.$$

Calculating $E_b[b^T b]$ requires the calculation of $E_b[b_j^2]$. In one embodiment, $b_j$ is assumed to have a cluster cardinality distribution, and $$E_b[b_j^2] = \frac{N}{C}\left[1 + (N-1)\frac{\left\{\begin{array}{c}N-1\\C\end{array}\right\}}{\left\{\begin{array}{c}N\\C\end{array}\right\}}\right],$$

where C is the number of columns and $$\left\{\begin{array}{c}N\\C\end{array}\right\}$$

is a Stirling number of the second kind. In this case, $$E_b[b^T b] = N + N(N-1)\frac{\left\{\begin{array}{c}N-1\\C\end{array}\right\}}{\left\{\begin{array}{c}N\\C\end{array}\right\}}.$$

In some embodiments, $b_j$ is assumed to have a binomial distribution with a mean $p = 1/C$, in which case $$E_b[b_j^2] = \frac{N}{C}\left[1 + \frac{(N-1)}{C}\right].$$

Thus, $$E_b[b^T b] = N\left[1 + \frac{(N-1)}{C}\right].$$

This generates the following adjusted similarity index (e.g., the ARRI) for fixed labels and random clusters:

$$ARRI(M \mid a, b) = \frac{N^2 - N - a^T S a - b^T b + 2\sum_{j=1}^{C} \alpha_j^T S \alpha_j}{N(N-1)} - \frac{N^2 - N - a^T S a - E_b[b^T b] + 2\left[\frac{(a^T S a - N)(E_b[b^T b] - N)}{N(N-1)} + N\right]}{N(N-1)}.$$

Eliminating the common terms in the difference leads to:

$$ARRI(M \mid a, b) \propto$$

$$\sum_{j=1}^{C} \alpha_j^T S \alpha_j + \frac{E_b[b^T b] - b^T b}{2} - \frac{(a^T S a - N)(E_b[b^T b] - N)}{N(N-1)} - N.$$

Figure 24:
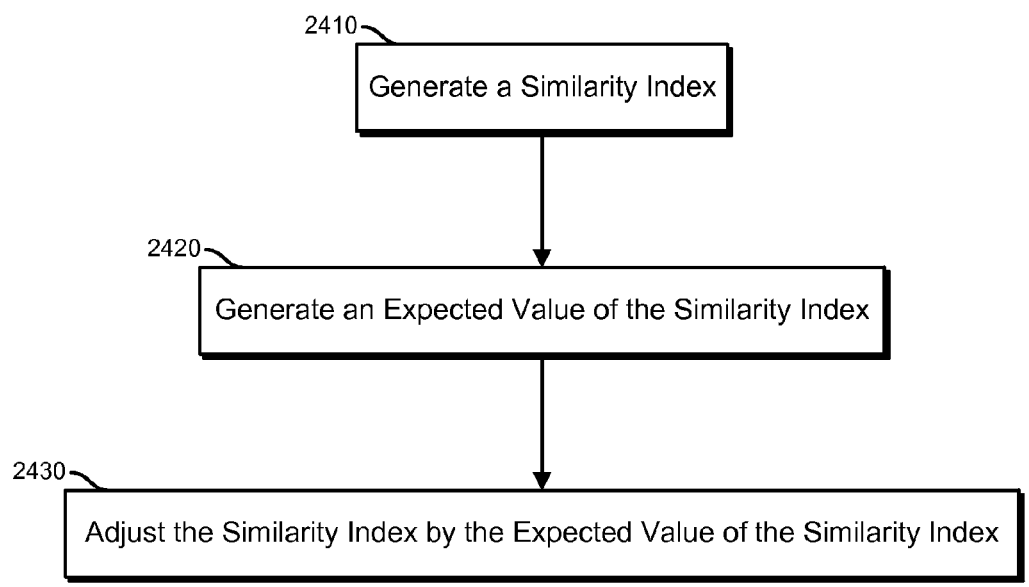
FIG. 24 is a block diagram that illustrates an example embodiment of a method for generating an adjusted similarity index.

FIG. 24 is a block diagram that illustrates an example embodiment of a method for generating an adjusted similarity index. Flow starts in block 2410, where a similarity index is generated. Next, in block 2420, an expected value of the similarity index is generated. Finally, in block 2430, the similarity index is adjusted by the expected value of the similarity index.

FIG. 25 shows the respective similarity indexes, expected values of the similarity indexes, and adjusted similarity indexes for sets of clusters and ontologies. The first table 2501 shows the respective similarity indexes, expected values of the similarity indexes (generated using fixed row marginals and variable column marginals), and adjusted similarity indexes for the sets of clusters shown in FIG. 1 and FIG. 2 that were generated using the ontologies shown in FIG. 3, FIG. 16, and FIG. 18 and the similarity matrixes shown in FIG. 5, FIG. 17, and FIG. 19. As shown in the first table 2501, the ERRI depends on the number of clusters in a set and the similarity matrix used to generate the ERRI. Thus, when similarity matrix 595 is used, the ERRI for set 100A (which has 4 clusters) is 0.4389 and the ERRI for set 200B (which has 3 clusters) is 0.4552. Also, when similarity matrix 1900 is used, the ERRI for set 100A is 0.2889.

The second table 2502 shows the respective similarity indexes, expected values of the similarity indexes, and adjusted similarity indexes for the sets of clusters shown in FIG. 15 that were generated using the ontologies shown in FIG. 16 and FIG. 18 and the similarity matrixes shown in FIG. 17 and FIG. 19. When the similarity matrix 1700 is used, set 1500A has the highest RRI and ARRI. However, when similarity matrix 1900 is used, set 1500B has the highest RRI and ARRI.

The third table 2503 shows the respective similarity indexes, expected values of the similarity indexes, and adjusted similarity indexes for the sets of clusters shown in FIG. 20 that were generated using the ontology shown in FIG. 21 and the similarity matrix shown in FIG. 22. Based on the ARRI values, set 2000B is about 70% better than set 2000A.

Figure 26:
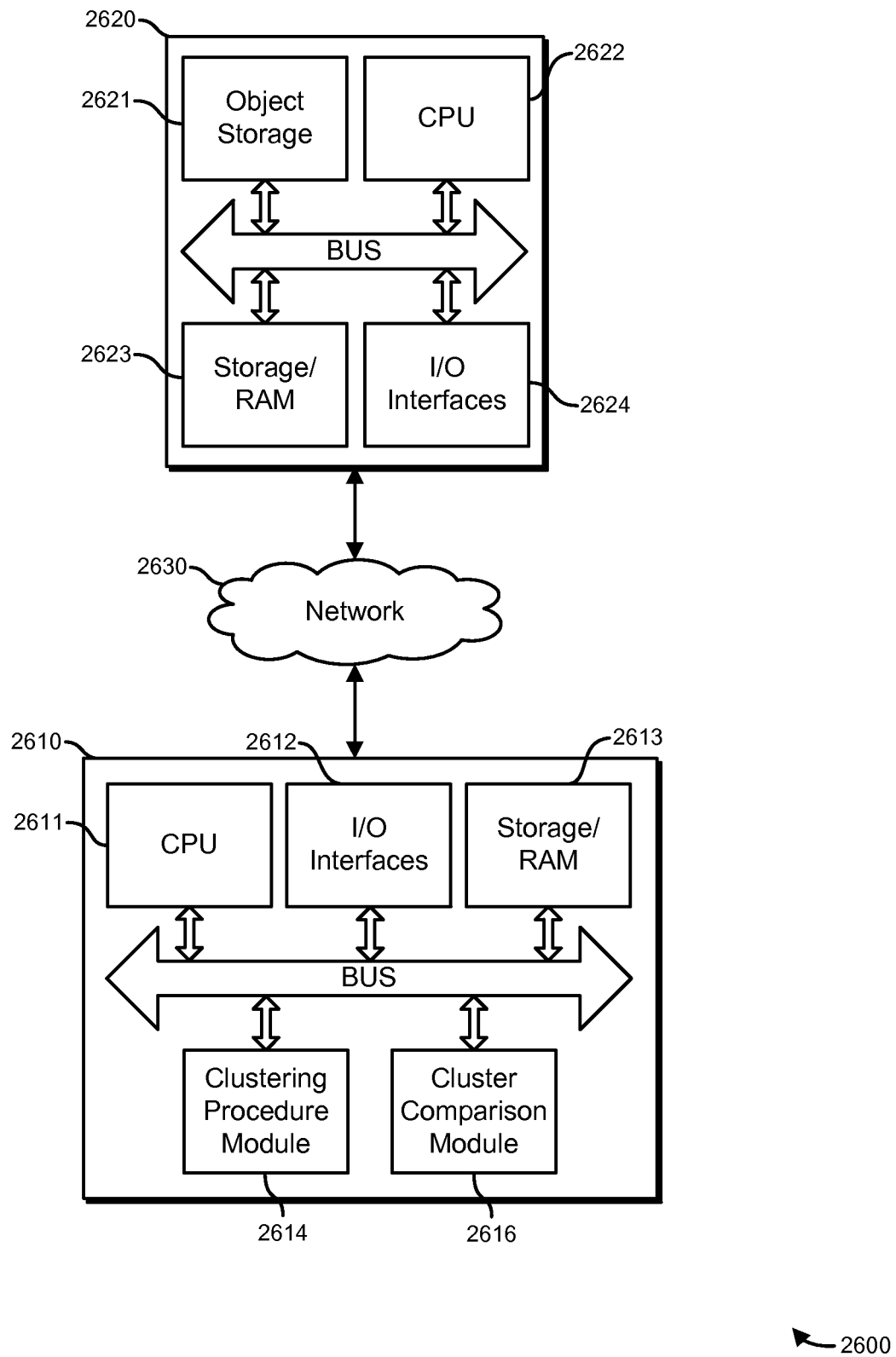
FIG. 26 is a block diagram that illustrates an example embodiment of a system for comparing object clusters.

FIG. 26 is a block diagram that illustrates an example embodiment of a system 2600 for comparing object clusters. The system includes a cluster comparison device 2610 and an object storage device 2620, both of which include computing devices (e.g., a desktop computer, a server, a PDA, a laptop, a tablet, a phone). The cluster comparison device 2610 includes one or more processors (CPU) 2611, I/O interfaces 2612, and storage/RAM 2613. The CPU 2611 includes one or more central processing units (e.g., microprocessors) and is configured to read and perform computer-executable instructions, such as instructions stored in the modules. The computer-executable instructions may include those for the performance of the methods described herein. The I/O interfaces 2612 provide communication interfaces to input and output devices, which may include a keyboard, a display, a mouse, a printing device, a touch screen, a light pen, an optical storage device, a scanner, a microphone, a camera, a drive, and a network (either wired or wireless).

Storage/RAM 2613 includes one or more computer readable and/or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc. Storage/RAM 2613 may store computer-readable data and/or instructions. The members of the cluster comparison device 2610 communicate via a bus.

The cluster comparison device 2610 also includes a clustering procedure module 2614 and a cluster comparison module 2616. The clustering procedure module 2614 includes computer-executable instructions that may be executed by the cluster comparison device 2610 to cause the cluster comparison device 2610 to perform one or more clustering procedures to cluster objects (e.g., assign the objects to respective clusters). The cluster comparison module 2616 includes computer-executable instructions that may be executed to cause the cluster comparison device 2610 to compare clusters created by a first clustering procedure to clusters created by a second clustering procedure (e.g., a clustering procedure based on object labels), for example by generating a similarity index, expected similarity index, or adjusted similarity index (e.g., by performing the methods described herein).

The object storage device 2620 includes a CPU 2622, storage/RAM 2623, and I/O interfaces 2624. The object storage device also includes object storage 2621. Object storage 2621 includes a computer-readable medium that stores objects (e.g., data that represents images, video, sounds, documents) thereon. The members of the object storage device 2620 communicate via a bus. The cluster comparison device 2610 may retrieve objects from the object storage 2621 on the object storage device 2620 via a network 2630.

Figure 27A:
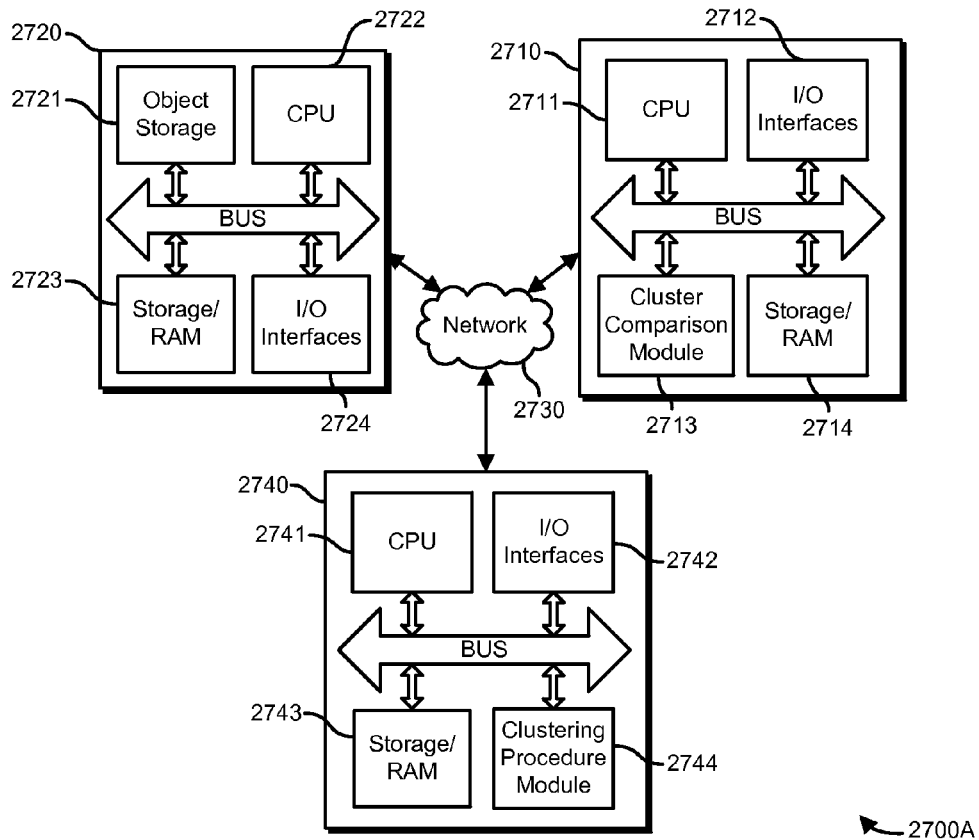
FIG. 27A is a block diagram that illustrates an example embodiment of a system for comparing object clusters.

FIG. 27A is a block diagram that illustrates an example embodiment of a system 2700A for comparing object clusters. The system includes a cluster comparison device 2710, an object storage device 2720, and a clustering device 2740. The cluster comparison device 2710 includes a CPU 2711, I/O interfaces 2712, a cluster comparison module 2713, and storage/RAM 2714. The object storage device 2720 includes a CPU 2722, I/O interfaces 2724, object storage 2721, and storage/RAM 2723. The clustering device 2740 includes a CPU 2741, I/O interfaces 2742, storage/RAM 2743, and a clustering procedure module 2744. The members of each of the devices communicate via a respective bus. In the embodiment shown in FIG. 27A, the clustering procedure device 2740 generates clusters using the clustering procedure module 2744 and stores the cluster on a computer-readable medium (e.g., storage/RAM 2743), and the clustering procedure device 2740 communicates with the object storage device 2720 via a network 2730 to access the objects in the object storage 2721. Also, the cluster comparison device 2710 compares the clusters. Thus, in this embodiment, different devices may store the objects, cluster the objects, and compare the clusters.

Figure 27B:
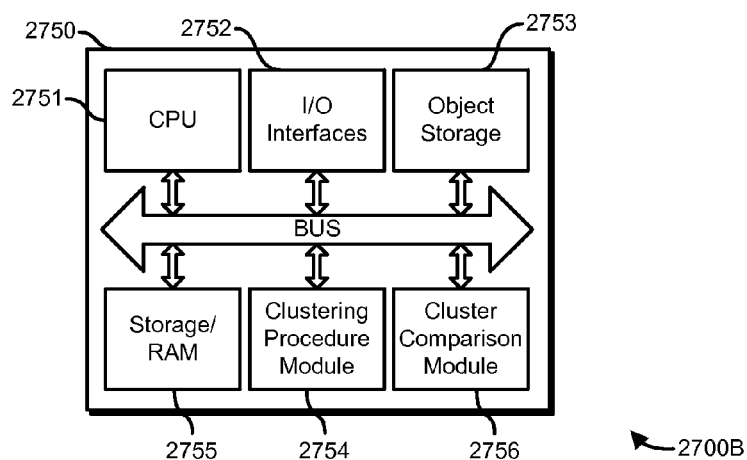
FIG. 27B is a block diagram that illustrates an example embodiment of a system for comparing object clusters.

FIG. 27B is a block diagram that illustrates an example embodiment of a system 2700B for comparing object clusters. The system includes a cluster comparison device 2750 that includes a CPU 2751, I/O interfaces 2752, object storage 2753, a clustering procedure module 2754, storage/RAM 2755, and a cluster comparison module 2756. The members of the cluster comparison device 2750 communicate via a bus. Therefore, in the embodiment shown in FIG. 27B, one computing device stores the objects, clusters the objects, and compares the clusters. However, other embodiments may organize the components differently than the example embodiments shown in FIG. 26, FIG. 27A, and FIG. 27B.

The above described devices, systems, and methods can be implemented by supplying one or more computer-readable media that store computer-executable instructions for realizing the above described operations to one or more computing devices that are configured to read the computer-executable instructions and execute them. In this case, the systems and/or devices perform the operations of the above-described embodiments when executing the computer-executable instructions. Also, an operating system on the one or more systems and/or devices may implement the operations of the above described embodiments. Thus, the computer-executable instructions and/or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium of a function-extension board inserted into the device or of a function-extension unit connected to the device, and a CPU on the function-extension board or unit may implement the operations of the above-described embodiments.

This disclosure has provided a detailed description with respect to particular explanatory embodiments. However, the scope of the appended claims is not limited to the above-described embodiments and includes various modifications and equivalent arrangements.

What is claimed is:

1. A method for measuring similarity between a set of clusters and a set of object labels, wherein at least two of the object labels are related, the method comprising:
   receiving a first set of clusters, wherein the first set of clusters was formed by clustering objects in a set of objects into clusters of the first set of clusters according to a clustering procedure; and
   calculating a similarity index between the first set of clusters and a set of object labels based at least in part on a relationship between two or more object labels in the set of object labels,
   wherein the object labels are semantic labels,
   wherein the relationship between the two or more object labels is based at least in part on a semantic distance, and
   wherein the semantic distance is defined by a semantic ontology that includes the object labels.

2. The method of claim 1, wherein the semantic ontology includes a hierarchy of object labels.

3. The method of claim 1, further comprising:
   calculating an expected value of the similarity index, wherein the expected value of the similarity index is a value of the similarity index one would expect to obtain, on average, between a randomly generated second set of clusters and the object labels; and
   adjusting the calculated similarity index by a penalty factor based at least in part on the expected value of the similarity index.

4. The method of claim 3, wherein the expected value of the similarity index is based at least in part on the relationship between the two or more object labels.

5. A system for measuring similarity between a set of clusters and a corresponding set of object labels, the system comprising:
   one or more non-transitory computer-readable media configured to store computer-executable instructions; and
   one or more processors configured to cause the system to
      receive a set of object clusters, wherein the set of object clusters includes two or more clusters,
      receive a set of object labels, and
      generate a similarity index between the set of clusters and the set of object labels based at least in part on a relationship between two or more object labels in the set of object labels,
   wherein the object labels are semantic labels,
   wherein the relationship between the two or more object labels is based at least in part on a semantic distance, and
   wherein the semantic distance is defined by a semantic ontology that includes the object labels.

6. The system of claim 5, wherein generating the similarity index comprises:
   generating a similarity measurement for a first cluster and a first object label, wherein the similarity measurement is based on a number of objects shared by the first cluster and the first object label; and
   adjusting the similarity measurement based on a relationship between the first object label and another object label.

7. The system of claim 6, wherein generating the similarity index further comprises adjusting a similarity measurement for the first cluster and the first object label based on the relationship between the two or more object labels.

8. The system of claim 5, wherein the semantic ontology is organized in a hierarchy.

9. The system of claim 5, wherein generating the similarity index comprises:
   generating a similarity measurement for a first cluster and a first object label, wherein the similarity measurement is based on a number of objects excluded by both the first cluster and the first object label; and
   adjusting the similarity measurement based on the relationship between the two or more object labels.

10. The system of claim 5, wherein the similarity index is further based on a relationship between a first object label of a first object in a cluster and a second object label of a second object in the cluster.

11. One or more non-transitory computer-readable media storing instructions that, when executed by one or more computing devices, cause the one or more computing devices to perform operations comprising:
    receiving a set of clusters of objects, wherein the set of clusters includes two or more clusters of objects;
    receiving a set of object labels of objects, wherein the set of object labels includes two or more labels; and
    calculating a similarity index between the set of clusters and the set of object labels based at least in part on a relationship between two or more object labels in the set of object labels,
    wherein the object labels are semantic labels,
    wherein the relationship between the two or more object labels is based at least in part on a semantic distance, and
    wherein the semantic distance is defined by a semantic ontology that includes the object labels.

12. The one or more non-transitory computer-readable media of claim 11, wherein the similarity index is based on a relationship between respective object labels of two differently-labeled objects in a cluster.

13. The one or more non-transitory computer-readable media of claim 11, wherein the similarity index is based at least in part on a Rand Index.

14. The one or more non-transitory computer-readable media of claim 13, wherein the similarity index is calculated according to $$RRI = \frac{N^2 - N - a^T Sa - b^T b + 2\sum_{j=1}^{C} \alpha_j^T S \alpha_j}{N(N-1)},$$

where RRI is the similarity index, N is a total number of objects, $\alpha_j$ is the j-th cluster assignment counts vector wherein each count corresponds to its respective label, C is a total number of clusters, S is a similarity matrix that defines relationships between two or more object labels, a is a vector of total numbers of objects labeled with respective object labels, and b is a vector of total numbers of objects in respective clusters.

15. The one or more non-transitory computer-readable media of claim 11, wherein the similarity index is based at least in part on a relationship-based cluster purity measure.

* * * * *